(12) United States Patent
Sakaji et al.

(10) Patent No.: US 8,081,804 B2
(45) Date of Patent: Dec. 20, 2011

(54) ELECTRONIC CAMERA AND OBJECT SCENE IMAGE REPRODUCING APPARATUS

(75) Inventors: Ryo Sakaji, Osaka (JP); Nobuhiko Ichii, Osaka (JP); Yurie Sakai, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 12/186,818

(22) Filed: Aug. 6, 2008

(65) Prior Publication Data

US 2009/0041355 A1 Feb. 12, 2009

(30) Foreign Application Priority Data

Aug. 8, 2007 (JP) ................................ 2007-207281

(51) Int. Cl.
*G06K 9/36* (2006.01)
(52) U.S. Cl. ....................................................... 382/118
(58) Field of Classification Search .................... None
See application file for complete search history.

(56) References Cited

U.S. PATENT DOCUMENTS

| | | | |
|---|---|---|---|
| 2005/0025376 A1 | 2/2005 | Ishida | |
| 2005/0219393 A1* | 10/2005 | Sugimoto | 348/333.01 |
| 2006/0210264 A1 | 9/2006 | Saga | |
| 2008/0043135 A1* | 2/2008 | Sugimoto | 348/345 |
| 2009/0285481 A1* | 11/2009 | Ishida | 382/167 |

FOREIGN PATENT DOCUMENTS

| | | |
|---|---|---|
| CN | 1812492 A | 8/2006 |
| JP | 08-331495 A | 12/1996 |
| JP | 2000-278578 A | 10/2000 |
| JP | 2005-318009 A | 10/2005 |
| JP | 2005-318515 A | 11/2005 |
| JP | 2005-354333 A | 12/2005 |
| JP | 2006-295888 A | 10/2006 |
| JP | 2007-195099 A | 8/2007 |

OTHER PUBLICATIONS

Chinese Office Action dated Jun. 22, 2011, issued in corresponding Chinese Patent Application No. 200810129804.6.
Japanese Office Action dated Aug. 23, 2011 (mailing date), issued in related Japanese Patent Application No. 2007-207281 with an English language translation.

* cited by examiner

*Primary Examiner* — Brian Werner
(74) *Attorney, Agent, or Firm* — Westerman, Hattori, Daniels & Adrian, LLP

(57) ABSTRACT

An electronic camera is provided with: an imager, having an imaging surface for capturing an object scene, for generating an object scene image; a designator for designating a specific position within the object scene image generated by the imager; a recorder for recording, together with position information of the specific position designated by the designator, the object scene image generated by the imager; and a reproducer for reproducing the object scene image recorded by the recorder, using the position information recorded by the recorder.

6 Claims, 24 Drawing Sheets

SEARCH PROCESS

FACE INFORMATION

| NO. | POSITION | SIZE | DEGREE OF RELIABILITY |
|-----|----------|------|----------------------|
| 01 | . | . | . |
| 02 | . | . | . |
| 04 | . | . | . |
| 05 | . | . | . |
| 06 | . | . | . |
| : | : | : | : |
| N | . | . | . |

ELECTRONIC CAMERA AND OBJECT SCENE IMAGE REPRODUCING APPARATUS

CROSS REFERENCE OF RELATED APPLICATION

The disclosure of Japanese Patent Application No. 2007-207281 filed on Aug. 8, 2007 is incorporated herein by reference.

BACKGROUND OF THE INVENTION

1. Field of the Invention

The present invention relates to an electronic camera and an object-scene-image reproducing apparatus. More specifically, the preset invention relates to an electronic camera and an object-scene-image reproducing apparatus, for reproducing by noticing a specific position within an object scene image, for example.

2. Description of the Related Art

There is known an image reproducing apparatus which, upon reproduction of image data obtained by photographing using a digital still camera which is an electronic camera, detects a face image included in a subject image represented by the image data and displays the detected face image in an enlarged manner. In one example of such an image reproducing apparatus, a face image which is probably noticed upon photographing is prioritized over other portions and displayed in an enlarged manner, thereby facilitating confirming whether or not a face image portion is in focus.

However, in the above-described example, the face image included in the subject image represented by the image data is determined as a portion which is detected upon reproduction and displayed in an enlarged manner. Thus, it is probable that the portion displayed in an enlarged manner does no match a portion designated when photographing, i.e., a portion to be focused. Furthermore, there is a problem in that when a technology disclosed in the above-described example is applied to enable the use of not only a face but also a building and a background, for example, as the portion to be focused when photographing, in order that the reproducing apparatus detects, upon reproduction, the portion to be displayed in an enlarged manner, a configuration of a detector, provided in the reproducing apparatus, for detecting the portion becomes complicated.

SUMMARY OF THE INVENTION

An electronic camera according to the present invention comprises: an imager, having an imaging surface for capturing an object scene, for generating an object scene image; a designator for designating a specific position within the object scene image generated by the imager; a recorder for recording, together with position information of the specific position designated by the designator, the object scene image generated by the imager; and a reproducer for reproducing the object scene image recorded by the recorder, using the position information recorded by the recorder.

Preferably, a searcher for searching a feature image included in the object scene image generated by the imager is further provided, wherein the designator designates the specific position based on a position of the feature image detected by the searcher.

Preferably, an adjustor for adjusting a photographing condition of the imager based on the object scene image at the specific position designated by the designator is further provided, wherein the recorder records an object scene image created in accordance with the imaging condition adjusted by the adjustor.

Further preferably, the photographing condition is a focal distance of the imager.

Preferably, the reproducer enlarges and reproduces the object scene image about a position specified by using the position information recorded by the recorder.

An object-scene-image reproducing apparatus according to the present invention is an object-scene-image reproducing apparatus for reproducing an object scene image from a recording medium recorded thereon with position information indicating a specific position within the object scene image, together with the object scene image, and the object-scene-image reproducing apparatus comprises a reproducer for reproducing the object scene image using the position information.

Preferably, the reproducer enlarges and reproduces the object scene image about a position specified by using the position information.

The above described features and advantages of the present invention will become more apparent from the following detailed description of the present invention when taken in conjunction with the accompanying drawings.

DETAILED DESCRIPTION OF THE PREFERRED EMBODIMENTS

Figure 1:
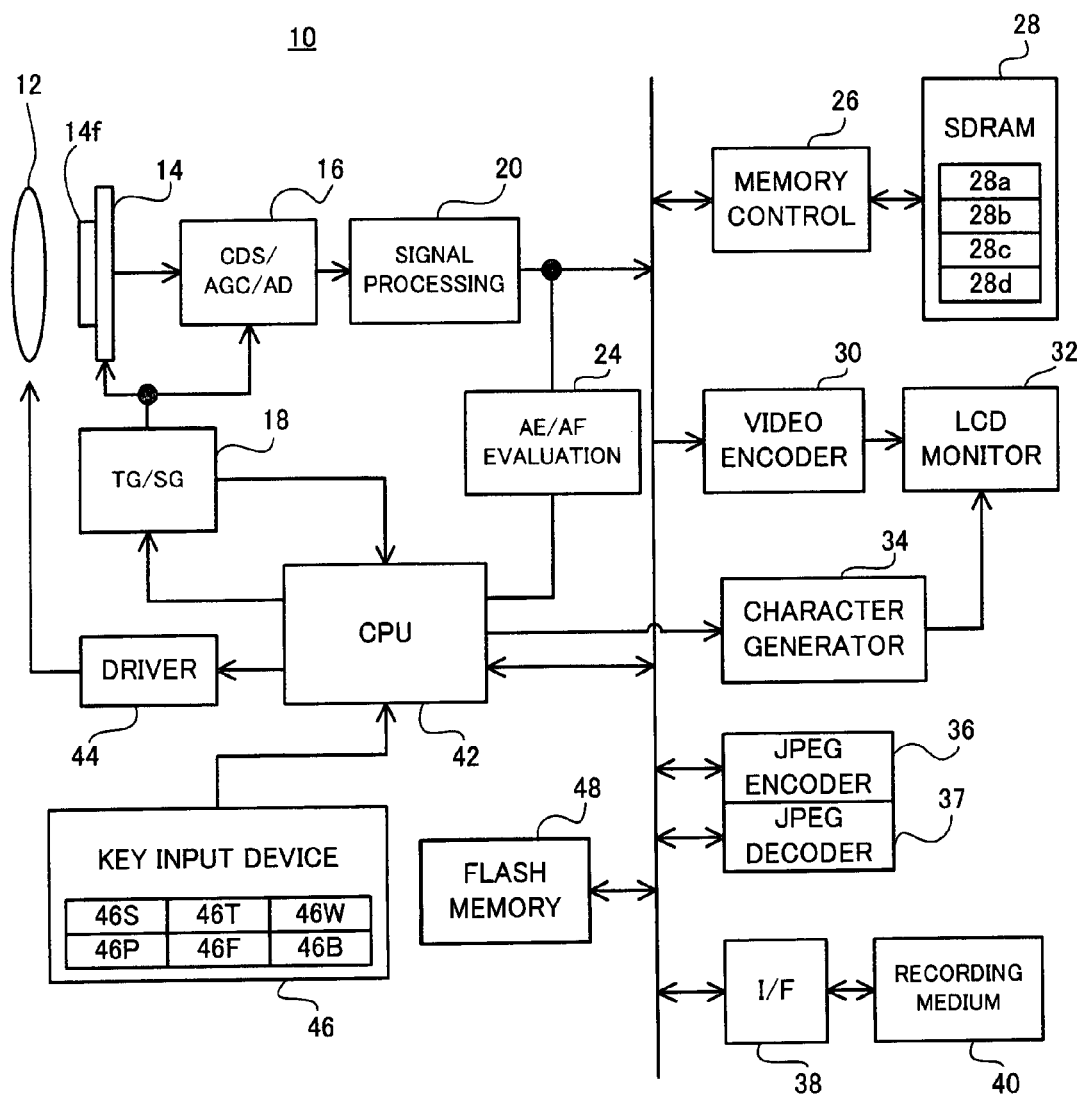
FIG. 1 is a block diagram showing a digital camera which is a first embodiment of the present invention.

With reference to FIG. 1, a digital camera 10 which is a first embodiment of the present invention includes an optical lens 12. An optical image of an object scene is irradiated onto an imaging surface 14*f* of an image sensor 14 through the optical lens 12, and then, photoelectrically converted. Thereby, an electric charge representing the object scene, i.e., a raw image signal is generated.

When a power source is turned on, a CPU 42 instructs a TG/SG 18 to repeatedly perform a pre-exposure and a thinning-out reading in order to execute a through-image process. The TG/SG 18 applies a plurality of timing signals to the image sensor 14 in order to execute a pre-exposure of the imaging surface 14*f* of the image sensor 14 and a thinning-out reading of the electric charge thus obtained. The raw image signal generated on the imaging surface 14*f* is read out according to an order of raster scanning in response to a vertical synchronization signal Vsync generated at a rate of once each 1/30 seconds.

The raw image signal outputted from the image sensor 14 is applied to a series of processes, such as a correlative double sampling, an automatic gain adjustment and an A/D conversion by a CDS/AGC/AD circuit 16. A signal-processing circuit 20 applies processes such as a white balance adjustment, a color separation, and a YUV conversion to the raw image data outputted from the CDS/AGC/AD circuit 16 and writes YUV-formatted image data to a display image region 28*a* of an SDRAM 28 through a memory control circuit 26.

A video encoder 30 reads out the image data accommodated in the display image region 28*a* through the memory control circuit 26 at every 1/30 seconds, and converts the read image data into a composite video signal. Thus, a real-time moving image (through image) representing the object scene is displayed on an LCD monitor 32.

An AE/AF evaluation circuit 24 creates a luminance evaluation value indicating a brightness of the object scene and a focus evaluation value indicating a degree of focus of the object scene, based on the image data outputted from the signal processing circuit 20. The created luminance evaluation value and focus evaluation value are applied to the CPU 42.

It is noted that "AE" is an abbreviation of "Auto Exposure" and "AF" is an abbreviation of "Auto Focus".

When a shutter button 46S provided on a key input device 46 is not operated, the CPU 42 executes an AE process for a through image and an AF process. A pre-exposure time period set to the TG/SG 18 is controlled based on the luminance evaluation value from the AE/AF evaluation circuit 24. Thereby, the brightness of the through image is moderately adjusted. Based on the AF process based on the focus evaluation value from the AE/AF evaluation circuit 24, i.e., a so-called hill-climbing autofocus process for setting the optical lens 12 such that a high-frequency component of the image signal is maximized, the optical lens 12 is driven by a driver 44.

Figure 2:
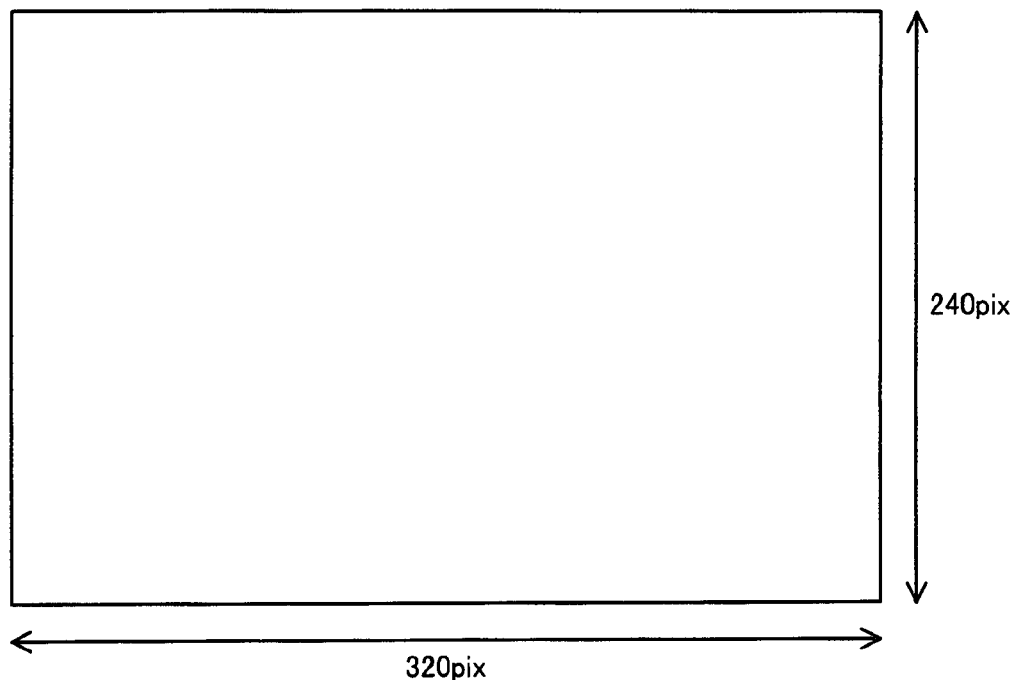
FIG. 2 is a descriptive diagram for describing an operation of the first embodiment of the present invention.
Figure 3:
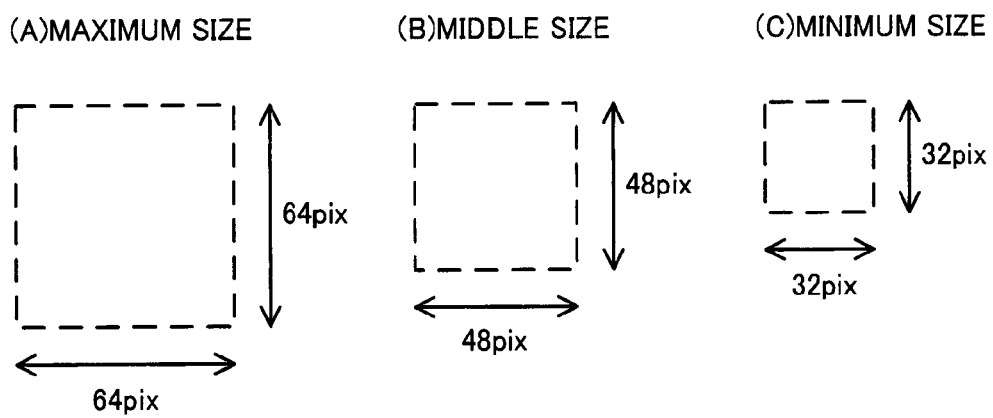
FIG. 3(A) is a descriptive diagram for describing the operation of the first embodiment of the present invention.
FIG. 3(B) is a descriptive diagram for describing the operation of the first embodiment of the present invention.
FIG. 3(C) is a descriptive diagram for describing the operation of the first embodiment of the present invention.

With reference to FIG. 2, the display image region 28*a* is made up of image data having 240 pixels vertically and 320 pixels horizontally, and set as a search region in which a face detection is performed. Then, a maximum-sized face determining region shown in FIG. 3(A) is arranged at an upper left of the search region. Coordinates at the upper left of the face determining region match those at the upper left of the search region.

Figure 4:
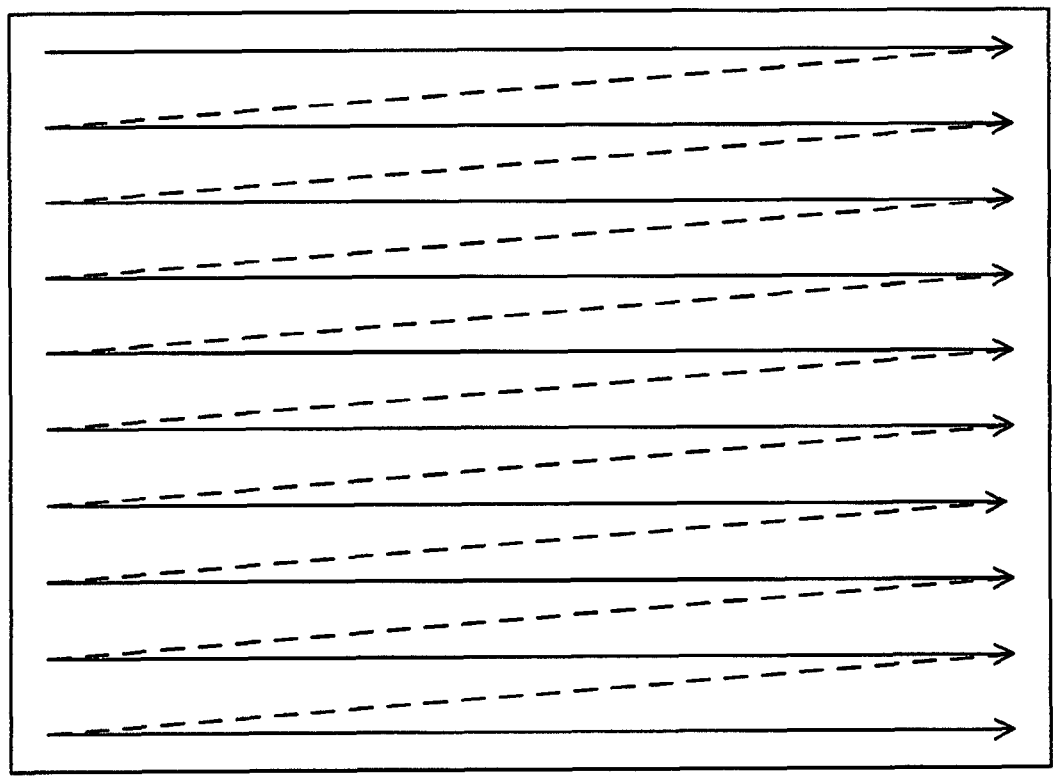
FIG. 4 is a descriptive diagram for describing the operation of the first embodiment of the present invention.

A feature amount of a partial image belonging to the face determining region is checked against that of a dictionary stored in a flash memory 48. As a result of the checking process, when the partial image to be noticed is determined as a face image, face information in which a size of the face determining region at this point, a central position of the face determining region, and a degree of reliability are described is created, and accommodated in a face information region 28*d* of the SDRAM 28. The degree of reliability indicates a matching ratio therebetween in the checking process in which a feature amount of the partial image belonging to the face determining region is checked against that of the dictionary stored in the flash memory 48. The higher the matching ratio, the greater the degree of reliability in which the image is determined as a face. The face determining region is moved by a predetermined amount (=one pixel) in a raster direction. The face determining region moves over the search region in a manner shown in FIG. 4.

It is noted that the degree of reliability is dependent on the dictionary stored in the flash memory 48, and a face facing a front can generally be detected with a higher degree of reliability than a face facing obliquely or looking down.

When the face determining region reaches a lower right of the search region, i.e., when the coordinates at the lower right of the face determining region match the coordinates at the lower right of the search region, a middle-sized face determining region shown in FIG. 3(B) is arranged at an upper left of the search region in place of the face determining region shown in FIG. 3(A) to thereby execute the processes as described above again. When the middle-sized face determining region reaches the lower right of the search region, a minimum-sized face determining region shown in FIG. 3(C) is arranged at the upper left of the search region to thereby repeat the processes as described above.

Thus, the checking process of the feature amounts and the moving process of the face determining region are executed three times by utilizing in turn the three face determining regions in descending order by size, i.e., the maximum size, the middle size, and the minimum size. When the face image is discovered in the course of the process, the face information in which the central position, the size, and the degree of reliability of the face determining region at this point are described is created, and thereby, the face information accommodated in the face information region 28*d* is updated.

When the face information is obtained, the CPU 42 instructs a character generator 34 to perform an OSD display of a character C1 defined by the face information. The character generator 34 applies character data to the LCD monitor 32 in order to display the character C1 having the size written in the face information at the position written in the face information. In a case of an object scene image including four persons P1, P2, P3, and P4 as shown in FIG. 5, as a result of the face detection, each of the character C1 is displayed so as to be overlapped with the through image in a manner shown in FIG. 6.

When the obtained face information is one, a region for obtaining the focus evaluation value is set to a position of the face where the face is detected, and when a plurality of faces are detected, the region for obtaining the focus evaluation value is set to a position of the face nearest the center position of an angle of view. In order to display that the setting is performed, the character data is applied to the LCD monitor 32. In the case of the object scene image including the four persons P1, P2, P3, and P4 as shown in FIG. 5, the position of the face nearest the center position of the angle of view is the position of the face of the person P3. Thus, a character C2 is displayed to be overlapped with the through image according to a manner shown in FIG. 7.

Figure 8:
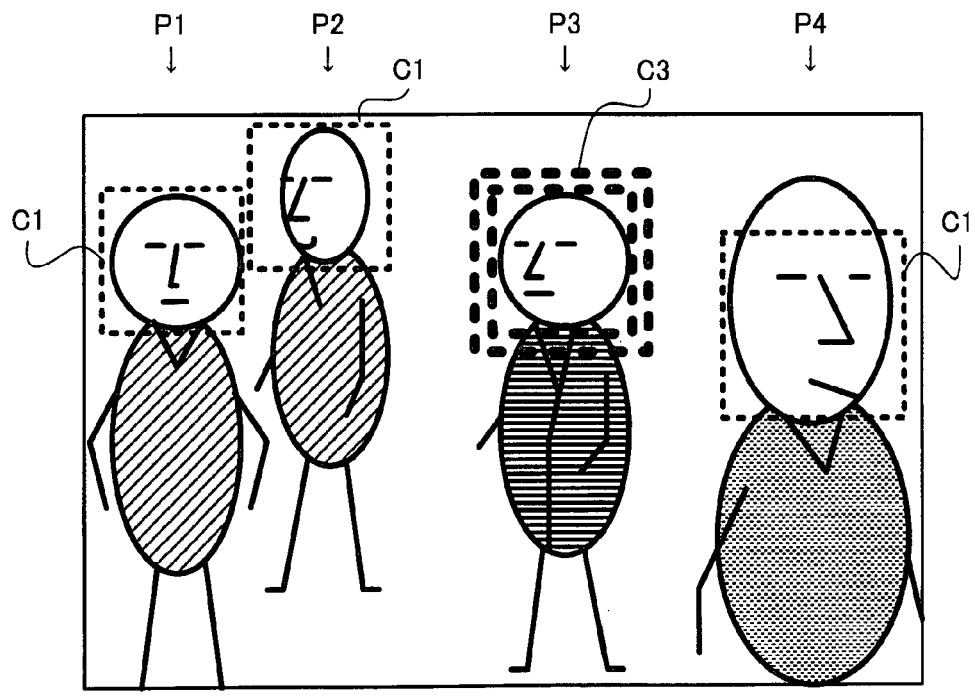
FIG. 8 is a descriptive diagram for describing the operation of the first embodiment of the present invention.

When the shutter button 46S is half-depressed, the CPU 42 executes the AF process and the AE process in a different mode depending on the detection result of the face information. When the face information is not detected, the CPU 42 executes the AE process and the AF process, using the central region of the imaging surface as a reference. The central region of the imaging surface is provided at the center of the imaging surface as a region having a high possibility of including a subject to be photographed. However, the detailed description is omitted. Contrary thereto, when the face information is detected, the CPU 42 uses the face information to determine a designated region to be designated on the imaging surface, and applies the character data to the LCD monitor 32 in order to display the designated region. In the case of the object scene image including the four persons P1, P2, P3, and P4 as shown in FIG. 5, a character C3 is displayed to be overlapped with the through image in a manner shown in FIG. 8 at a time when a setting of the focal position of the optical lens 12 is completed by the AF process described later. As a result of the character C3 being displayed, a user becomes able to know that the AF process is completed. When the detected face information is one, the designated region is set to a position of the face determining region when the face is detected in the face determining process, and when a plurality of faces are detected, the designated region is set to a position of the face determining region when a face nearest the center position of the angle of view is detected in the face determining process. Then, the AE process is executed by giving importance to the designated region, and the AF process is executed using the designated region as a reference, i.e., using the image signal obtained from the designated region. As a result of the AE process, the exposure time period set to the TG/SG 18 is set to an optimum value. Furthermore, as a result of the AF process, the optical lens 12 is set to a focal position by the driver 44.

Figure 5:
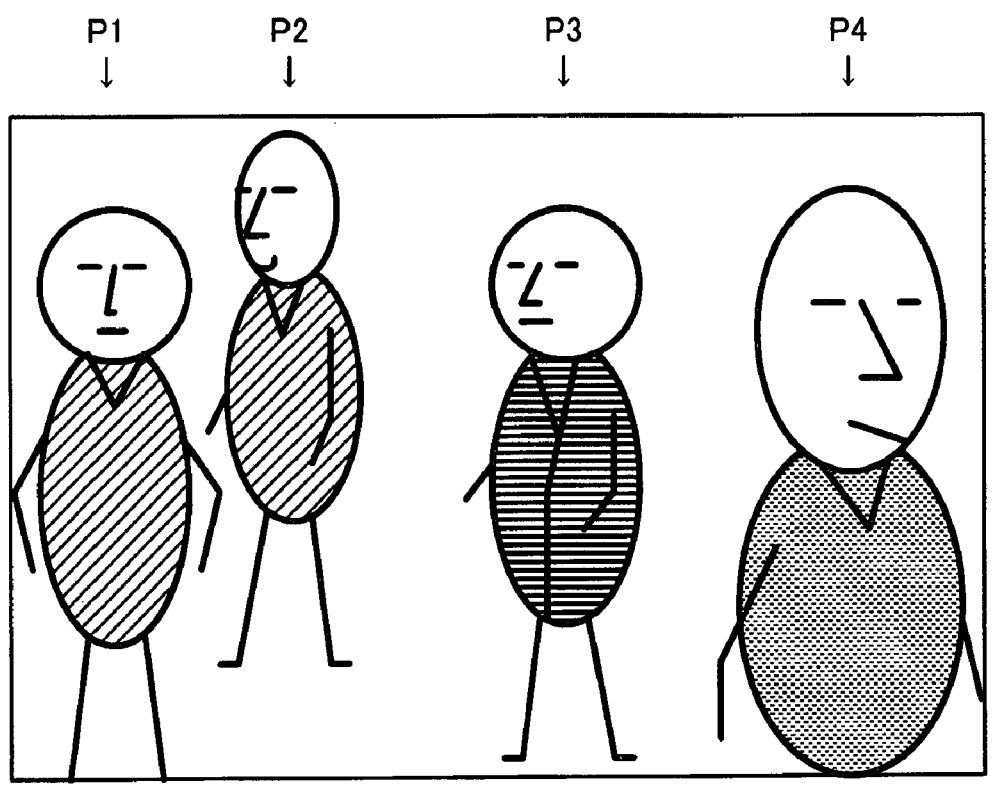
FIG. 5 is a descriptive diagram for describing the operation of the embodiment of the present invention.
Figure 6:
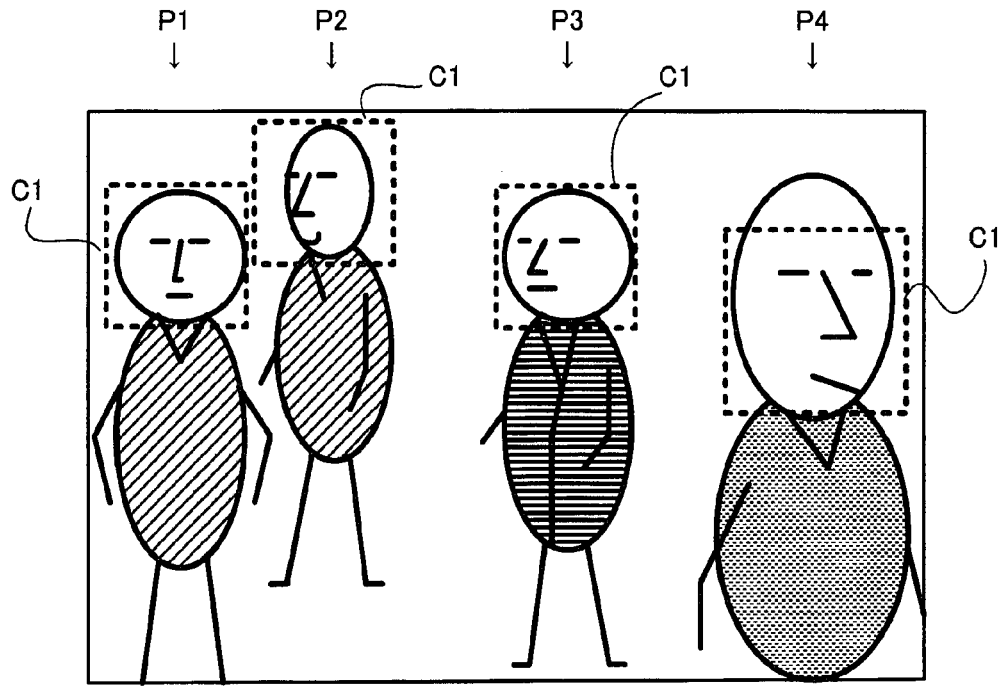
FIG. 6 is a descriptive diagram for describing the operation of the first embodiment of the present invention.
Figure 9:
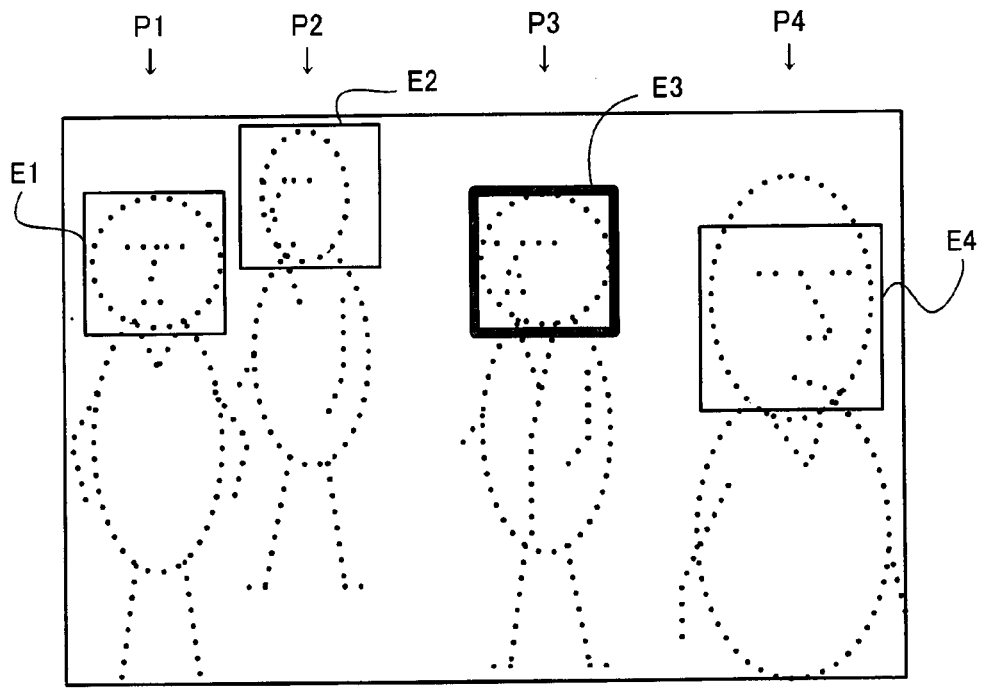
FIG. 9 is a descriptive diagram for describing the operation of the first embodiment of the present invention.

In the case of the object scene image including the four persons P1, P2, P3, and P4 as shown in FIG. 5, the face information is detected in four face determining regions as shown in FIG. 6. The position of the face determining region where the face nearest the center position of the angle of view is detected is the determination region where the face of the person P3 is detected, and therefore, as shown in FIG. 9, assuming that the region equivalent to the determination region where the face of the person P1 is detected is a region E1; the region equivalent to the determination region where the face of the person P2 is detected is a region E2; the region equivalent to the determination region where the face of the person P3 is detected is a region E3; and the region equivalent to the determination region where the face of the person P4 is detected is a region E4, the designated region is the region E3 equivalent to the determination region where the face of the person P3 is detected. The AE process is performed, importance is given to the luminance evaluation value obtained from the region E3 which becomes the designated region while the luminance evaluation values obtained from the regions E1, E2, E4 which are other regions are also used. In this embodiment, the AE process is performed using the luminance evaluation value calculated in a manner that a degree of contribution of the luminance evaluation value obtained from the region E3 is 50%, and a whole degree of contribution of the luminance evaluation values obtained from the regions E1, E2, and E3 is 50%.

When the shutter button 46S is completely depressed, the CPU 42 instructs the TG/SG 18 to perform a main exposure and all-pixel reading, and instructs a JPEG encoder 36 to perform a JPEG compression in order to execute a recording process.

It is noted that the positions and the sizes of the regions E1, E2, E3, and E4 are set based on the positions and sizes of the determination regions where the faces of the persons P1, P2, P3, and P4 are detected, and however, the positions and the sizes thereof may not strictly be the same. The position and the size of each of the regions E1, E2, E3, and E4 are set by combining a total of 256 partial regions, i.e., 16 vertical regions×16 horizontal regions, set to the imaging surface 14*f*, for example.

The TG/SG 18 applies a plurality of timing signals to the image sensor 14 in order to execute a main exposure of the imaging surface 14*f* of the image sensor 14 and reading out of all the electric charges thus obtained. The raw image signal generated on the imaging surface 14*f* is read out according to an order of raster scanning. The raw image signal outputted from the image sensor 14 is applied to a series of processes, such as a correlative double sampling, an automatic gain adjustment, and an A/D conversion by a CDS/AGC/AD circuit 16. The signal processing circuit 20 applies processes such as white balance adjustment, a color separation, a YUV conversion, etc., to the raw image data outputted from the CDS/AGC/AD circuit 16 so that the raw image data is converted into image data in a YUV format with a resolution higher than that of the image data accommodated in the display image region 28*a*, i.e., the image data being configured by all pixels of the image sensor 14 of which the total number of pixels is about 5 millions, i.e., having 1944 pixels vertically and 2592 pixels horizontally. The converted image data is written to an uncompressed image region 28b of the SDRAM 28 through the memory control circuit 26.

The JPEG encoder 36 reads out the image data accommodated in the uncompressed image region 28b through the memory control circuit 26, compresses the read image data in a JPEG format, and writes the compressed image data, i.e., JPEG data, to a compressed image region 28c through the memory control circuit 26. The JPEG data thus obtained is thereafter read out by the CPU 42, and is recorded together with the position information in the recording medium 40 in a file format through the I/F 38 when there is position information indicating a position of the designated region determined by the detection of the face information. The recording medium 40 is capable of recording a plurality of image files.

Next, a reproducing operation is described. One of the files recorded in the recording medium 40 in a file format via the I/F 38 is selected to read out the JPEG data therefrom, and the read JPEG data is written to the compressed image region 28c of the SDRAM 28. A JPEG decoder 37 reads out the JPEG data accommodated in the compressed image region 28c through the memory control circuit 26, decompresses the read JPEG data, and writes the obtained image data to the uncompressed image region 28b through the memory control circuit 26. The image data written to the uncompressed image region 28b is read out through the memory control circuit 26, and from the read image data, image data for display, having a resolution lower than that of the image data is created and written to the display image region 28a of the SDRAM 28.

The video encoder 30 reads out the image data accommodated in the display image region 28a through the memory control circuit 26 at every 1/30 seconds, and converts the read image data into a composite video signal. As a result, a reproduced image is displayed on the LCD monitor 32.

When the above-described position information, together with the JPEG data, are recorded in the recording medium 40 in a state of being capable of read out, a zoom display is so performed that a central position of a reproduction zoom process is set based on the position information. In a case of the JPEG data in which the position information is not obtained, the zoom display is so performed that the center of the image is set to the central position of the reproduction zoom process.

The zoom display is so performed that image data obtained by performing a zoom process on the image data written to the uncompressed image region 28b based on a zoom magnification and a zoom center position is accommodated in the display image region 28a.

It is noted that the position information recorded in the recording medium 40 is position information represented by the number of pixels on the image data accommodated in the display image region 28a, and therefore, in reproducing, it is thus converted into the position information represented by the number of pixels on the image data written to the uncompressed image region 28b of the SDRAM 28, and the converted position information is used for the reproduction zoom process. The display image region 28a is made up of the image data having 240 pixels vertically and 320 pixels horizontally. When the image data written to the uncompressed image region 28b of the SDRAM 28 by reproducing the JPEG data is made up of image data having 1944 pixels vertically and 2592 pixels horizontally, a value of "8.1" obtained by dividing 1944 by 240 is multiplied by a value representing a vertical position of the image data written to the display image region 28a, and a value of "8.1" obtained by dividing 2592 by 320 is multiplied by the value representing the horizontal position of the image data written to the display image region 28a. In this manner, the position information recorded in the recording medium 40 is converted into the position information indicating the position on the image data written to the uncompressed image region 28b of the SDRAM 28 by reproducing the JPEG data, and the converted position information is used for the reproduction zoom process.

Figure 10:
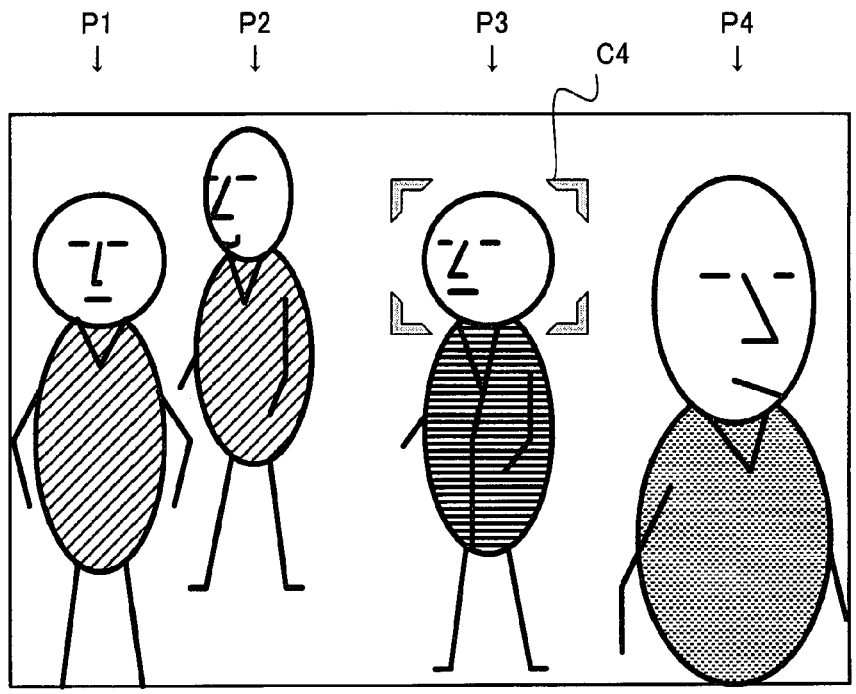
FIG. 10 is a descriptive diagram for describing the operation of the first embodiment of the present invention.
Figure 11:
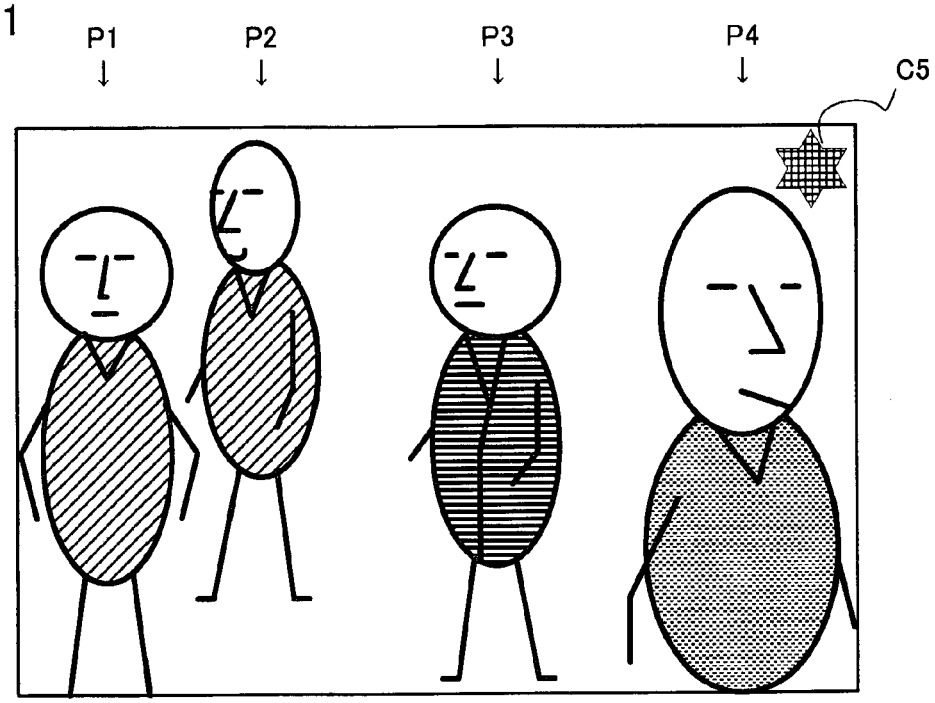
FIG. 11 is a descriptive diagram for describing the operation of the first embodiment of the present invention.

It is noted that when the position information is set to the central position of reproduction zoom process, the character data is applied to the LCD monitor 32 in order to display the central position. A character C4 is displayed to be overlapped with the reproduced image in a manner shown in FIG. 10. The character C4 serves to indicate the set central position. In addition, the character data indicating that the central position of the reproduction zoom process is set is applied to the LCD monitor 32 based on the position information corresponding to the JPEG data, and in this state, a character C5 may be displayed to be overlapped with the reproduced image in a manner shown in FIG. 11. Furthermore, the character C4 and the character C5 like these may not be displayed.

Figure 12:
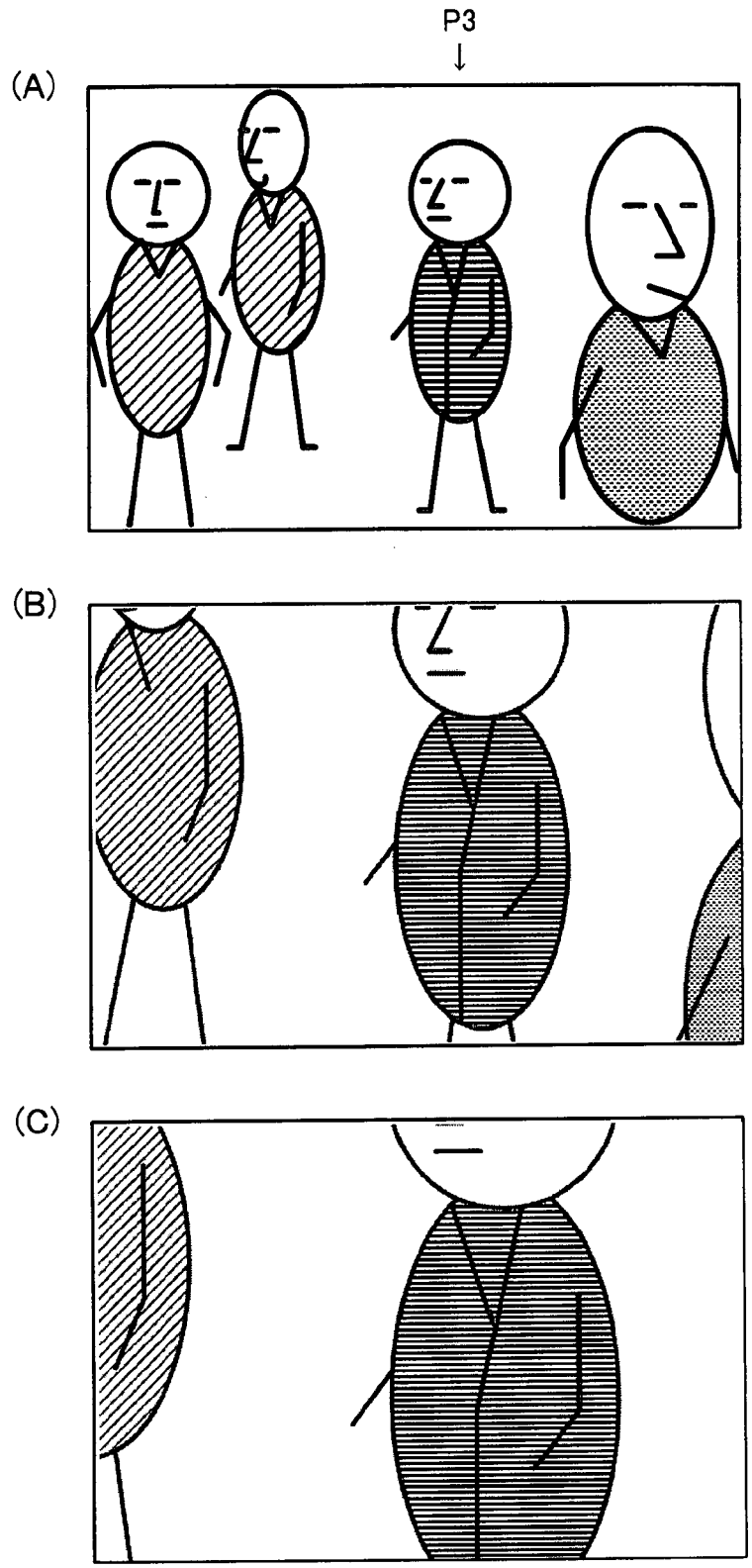
FIG. 12(A) is a descriptive diagram used for a comparison with the operation of the embodiment of the present invention.
FIG. 12(B) is a descriptive diagram used for a comparison with the operation of the embodiment of the present invention.
FIG. 12(C) is a descriptive diagram used for a comparison with the operation of the embodiment of the present invention.
Figure 13:
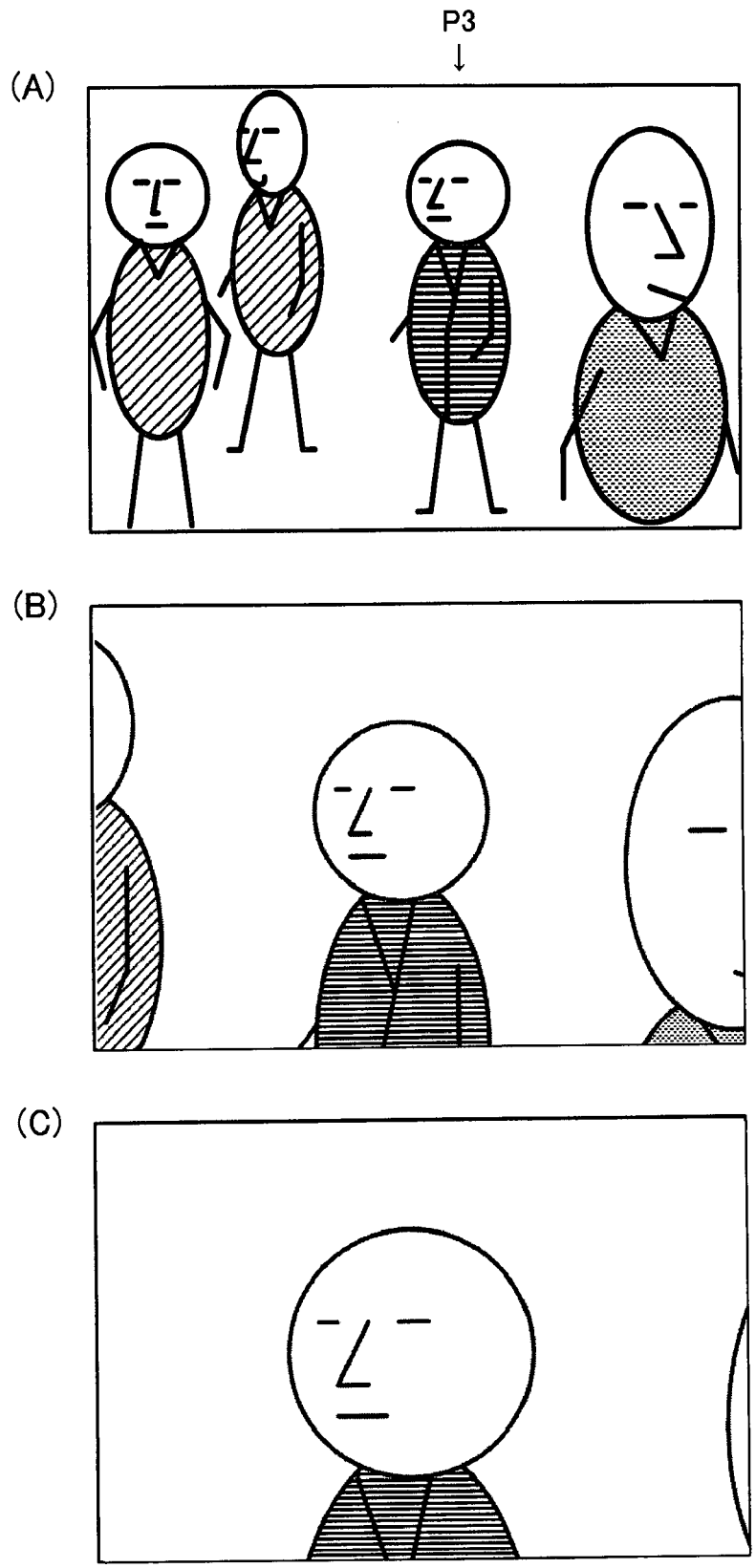
FIG. 13(A) is a descriptive diagram for describing the operation of the embodiment of the present invention.
FIG. 13(B) is a descriptive diagram for describing the operation of the embodiment of the present invention.
FIG. 13(C) is a descriptive diagram for describing the operation of the embodiment of the present invention.

On the assumption that when the center of the reproduction zoom process is not set by the position information accompanying the JPEG data read out from the recording medium 40, the center of the image is the central position of the zoom process and is displayed in an enlarged manner, as shown in FIG. 12(A) to FIG. 12(C). Thus, after an enlargement display operation, the central position needs to be changed. However, even with respect to the same reproduced image, when the center of the reproduction zoom process is set by the position information, a position corresponding to the position information is the central position and is displayed in an enlarged manner, as shown in FIG. 13(A) to FIG. 13(C). Thus, it is possible to reproduce the image more easily in an enlarged manner corresponding to a position noticed by the digital camera 10 when photographing.

Figure 14A:
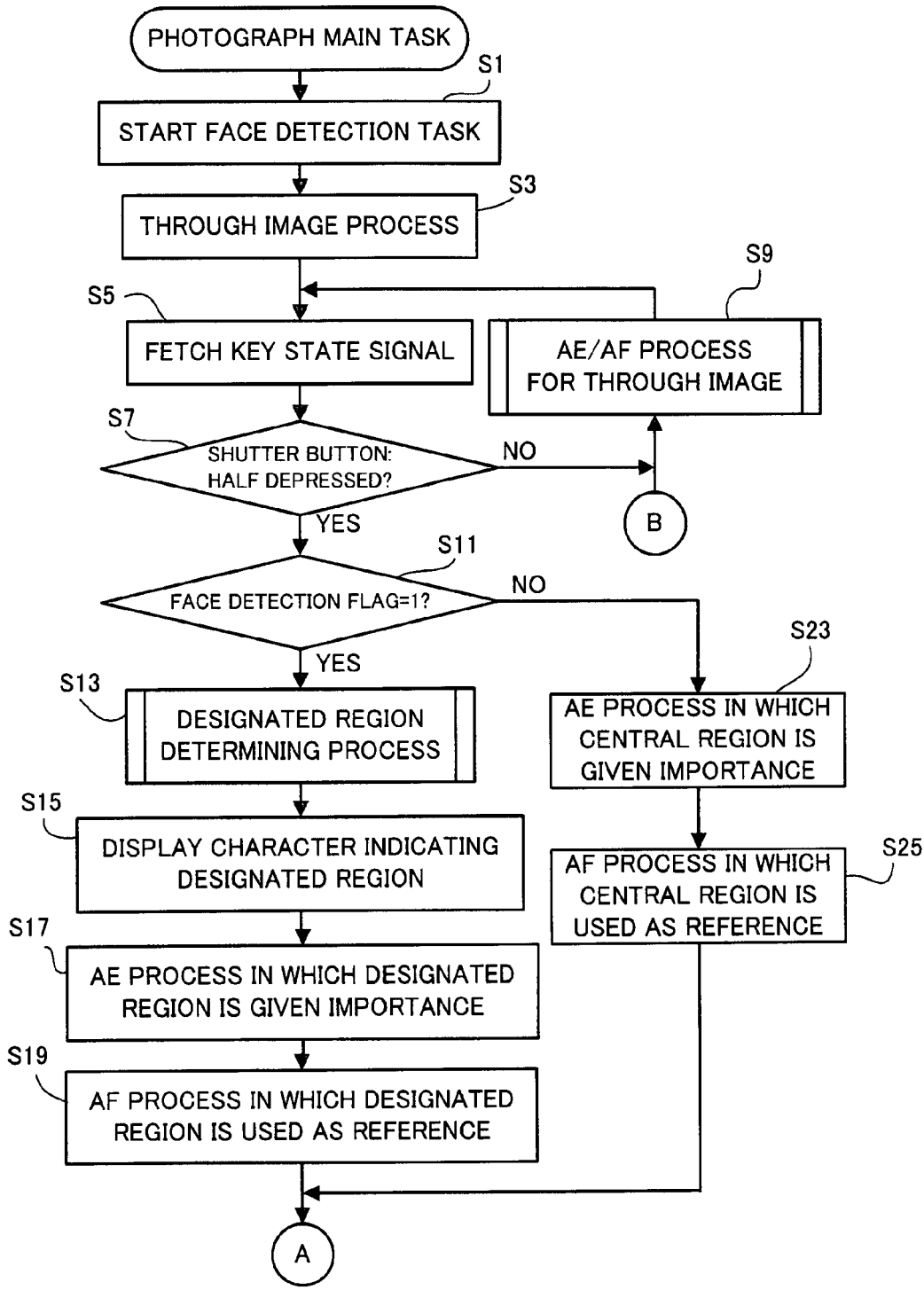
FIG. 14A is a flowchart for describing an operation of the first embodiment of the present invention.
Figure 14B:
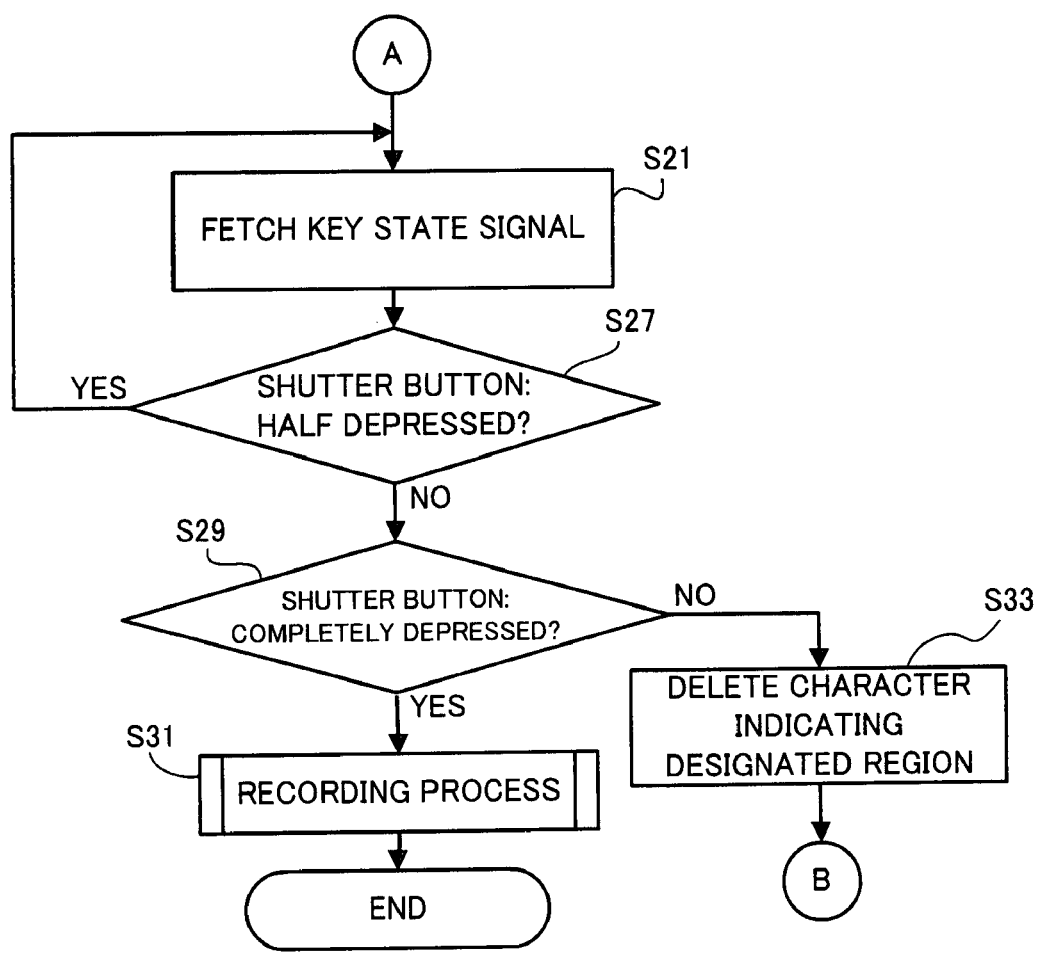
FIG. 14B is a flowchart for describing the operation of the first embodiment of the present invention.
Figure 15:
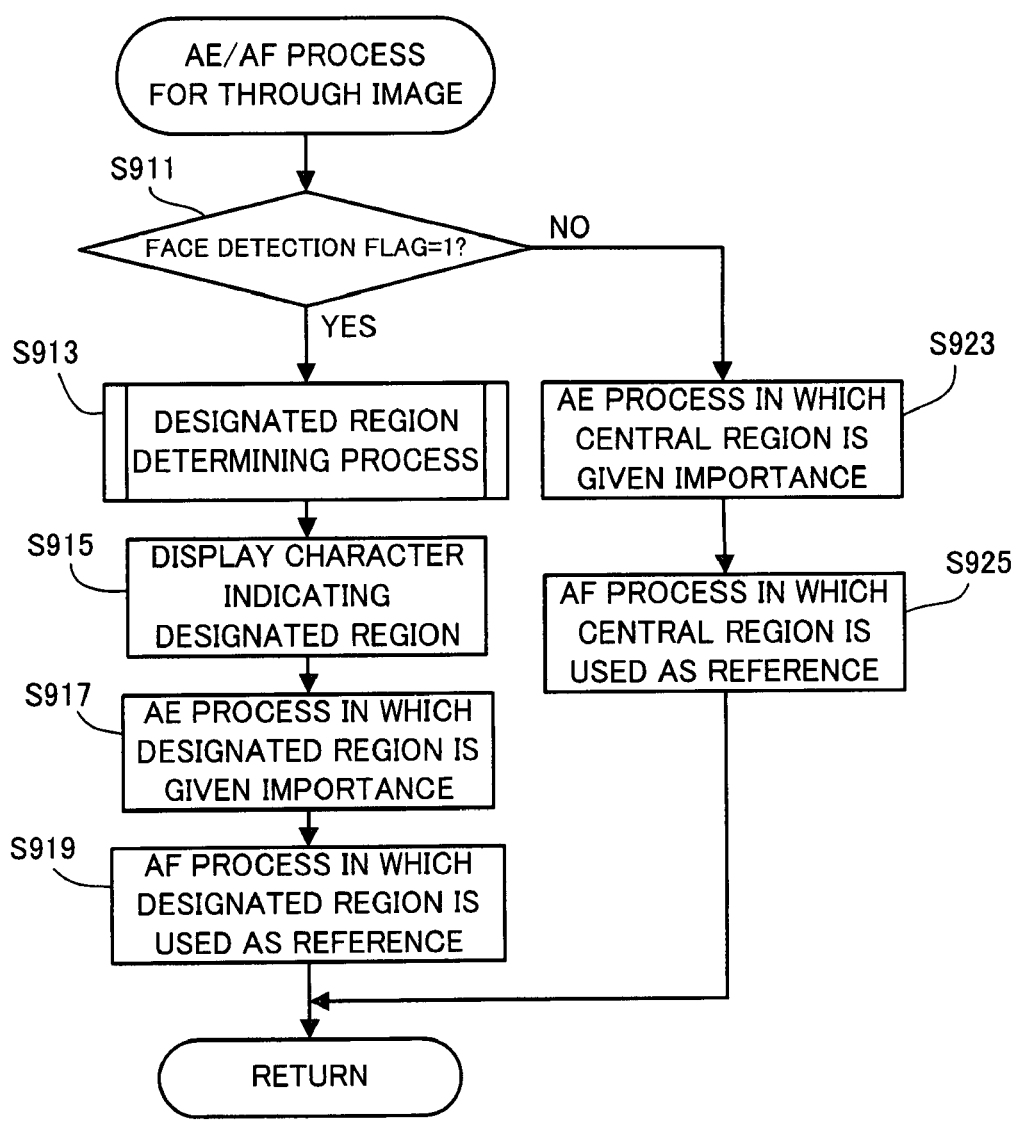
FIG. 15 is a flowchart for describing the operation of the first embodiment of the present invention.
Figure 16:
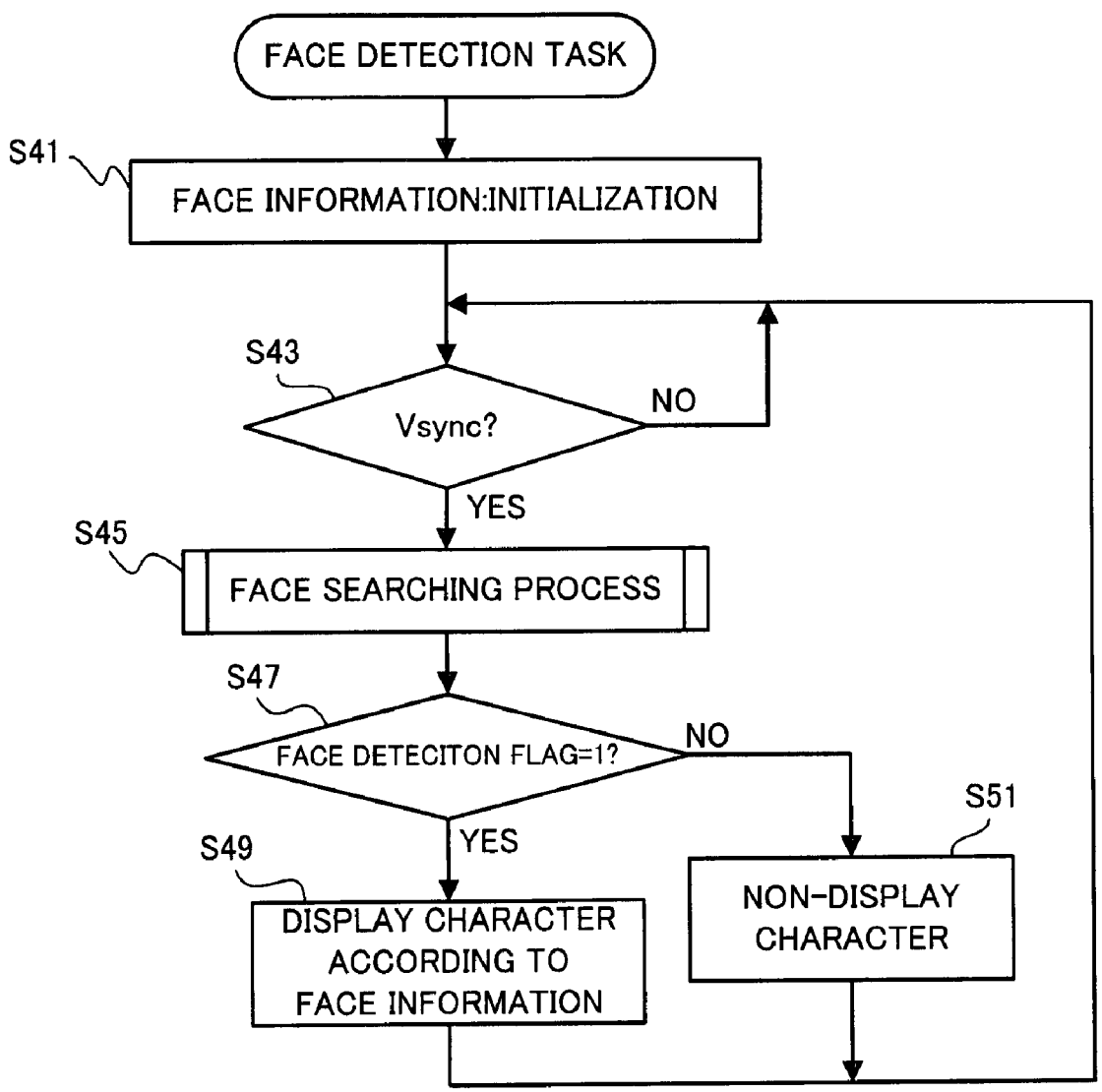
FIG. 16 is a flowchart for describing the operation of the first embodiment of the present invention.
Figure 17A:
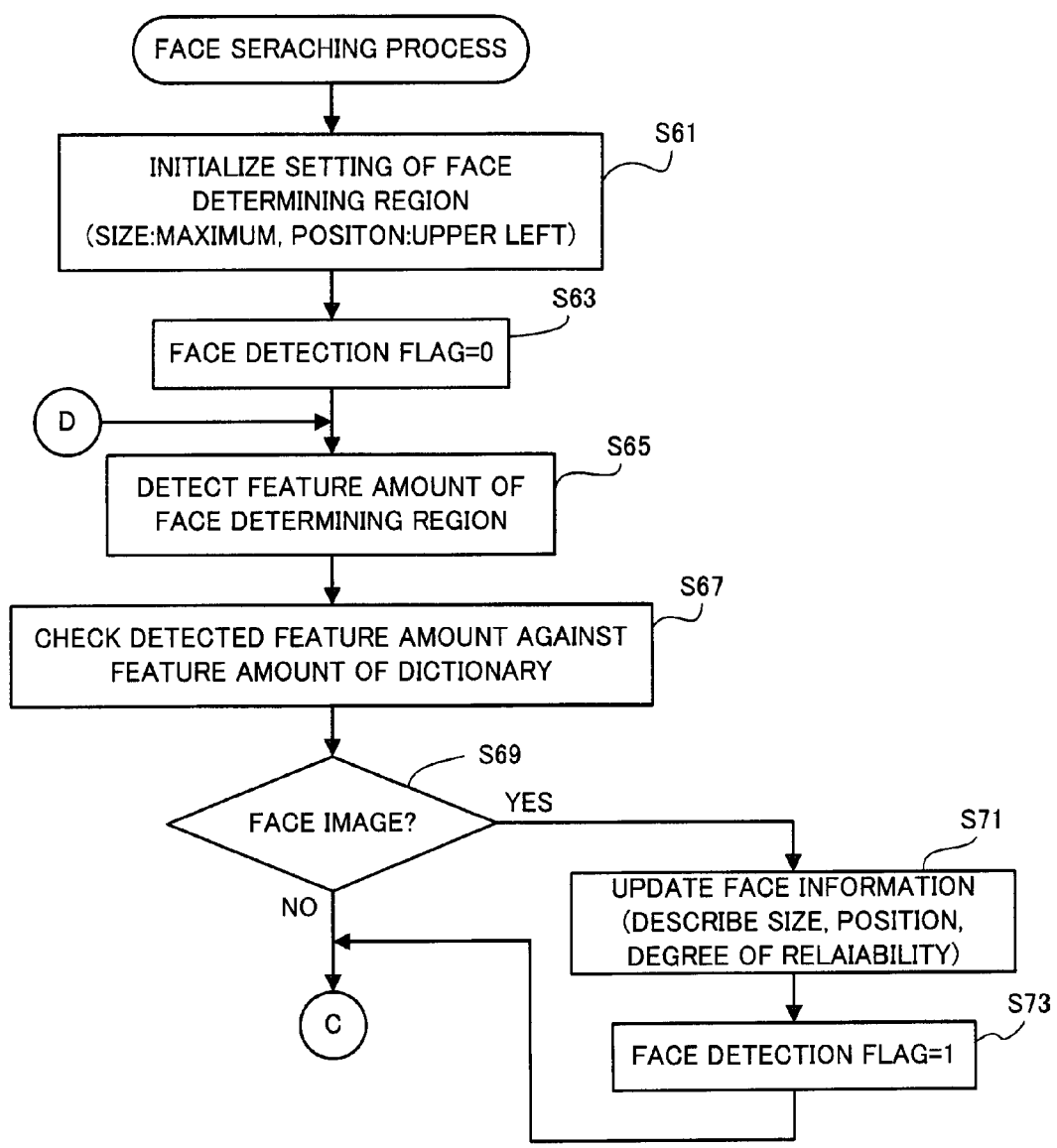
FIG. 17A is a flowchart for describing the operation of the first embodiment of the present invention.
Figure 17B:
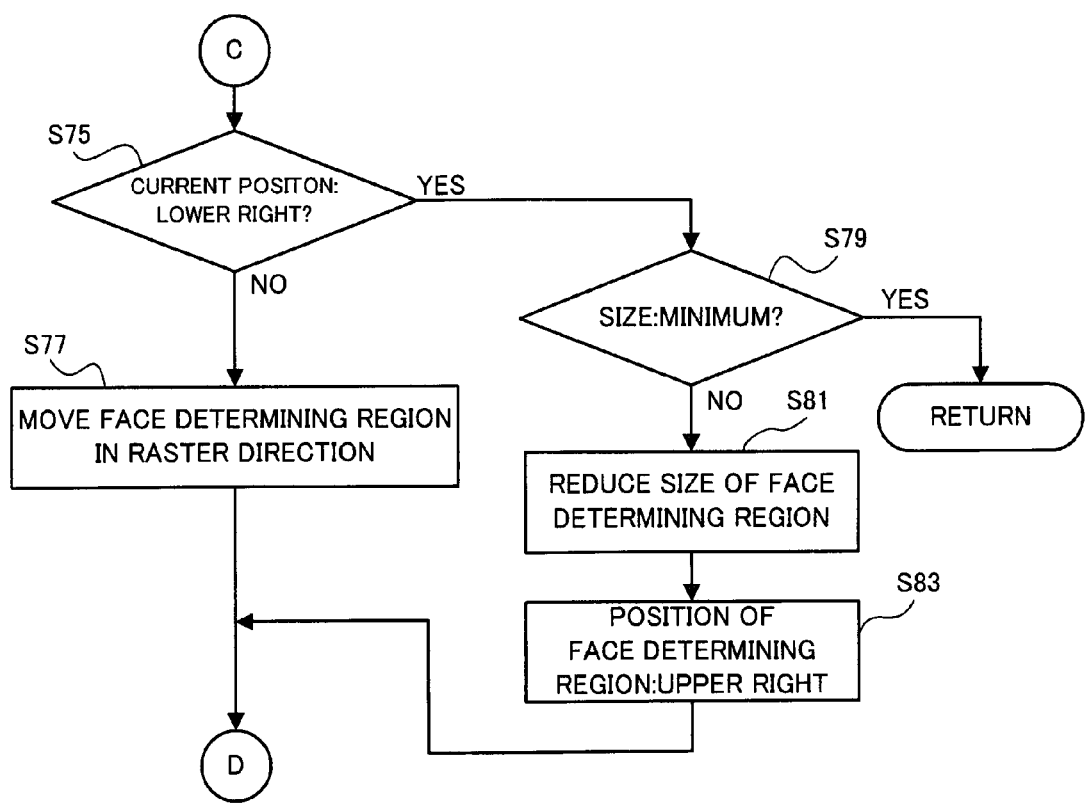
FIG. 17B is a flowchart for describing the operation of the first embodiment of the present invention.

In a photographing operation, the CPU 42 executes in parallel a plurality of tasks including a photograph main task shown in FIG. 14A, FIG. 14B, and FIG. 15 and a face detecting task shown in FIG. 16, FIG. 17A, and FIG. 17B. It is noted that a control program corresponding to these tasks is stored in a flash memory 48.

At first, with reference to FIG. 14A and FIG. 14B, the face detecting task is activated in a step S1, and the through-image process is executed in a step S3. By the process in the step S1, a process of the face detecting task shown in FIG. 16, FIG. 17A, and FIG. 17B is started. By the process in the step S3, the through image is displayed on the LCD monitor 32.

In a step S5, a key state signal is fetched from the key input device 46. In a step S7, it is determined whether or not the shutter button 46S is half-depressed, and when NO is determined, the AE/AF process for a through image is executed in a step S9, and the process returns to the step S5.

The AE/AF process for a through image shown in the step S9 is performed according to a flowchart shown in FIG. 15. In a step S911, it is determined whether or not a value of a face detection flag indicating that the face is detected by a face searching process to be described later is "1", and when YES is determined, the face information is used to determine the designated region in a step S913. When the detected face information is one, the designated region is set to the central position of the face determining region when the face is detected in the face determining process, and when a plurality of faces are detected, the designated region is set to the central position of the face determining region when the face nearest the center position of the angle of view is detected in the face determining process.

Then, a character display (display of the character C2) indicating the designated region is performed in a step S915, an AE process giving importance to the designated region is performed in a step S917, and an AF process using the designated region as a reference is performed in a step S919, and then, the process is restored to a routine at a hierarchical upper level.

The AE process is performed by giving importance to the luminance evaluation value obtained from the designated region, and by also using the luminance evaluation values obtained from the regions equivalent to the other face determining regions.

On the other hand, when NO is determined in the step S911, an AE process giving importance to the central region of the object scene image is performed in a step S923, an AF process using the central region of the object scene image as a reference is performed in a step S925, and then, the process is restored to a routine at a hierarchical upper level.

It is noted that as the AE/AF process for a through image shown in the step S9, irrespective of whether or not the face is detected by the face searching process, the AE process giving importance to the central region of the object scene image and the AF process using the central region of the object scene image as a reference may be performed as a simple AE/AF process.

Now, returning to FIG. 14A and FIG. 14B, the description is continued. When YES is determined in the step S7, it is determined whether or not the value of the face detection flag for indicating that the face is detected by the face searching process is "1" in a step S11, and when YES is determined, the face information is used to determine the designated region in a step S13. When the detected face information is one, the designated region is set to a position of the face determining region when the face is detected in the face determining process, and when a plurality of faces are detected, the designated region is set to a position of the face determining region when a face nearest the center position of the angle of view is detected in the face determining process.

Then, a character display (display of the character C3) indicating the designated region is performed in a step S15, the AE process giving importance to the designated region is performed in a step S17, and the AF process using the designated region as a reference is performed in a step S19, and then, the process proceeds to a step S21.

The AE process is performed by giving importance to the luminance evaluation value obtained from the face determining region as the designated region while using, together therewith, the luminance evaluation values obtained from other face determining regions. In the case of the object scene image including the four persons P1, P2, P3, and P4 as shown in FIG. 5, the face information is detected in the four face determining regions as shown in FIG. 6. The position of the face determining region where the face nearest the center position of the angle of view is detected is the determination region where the face of the person P3 is detected, and therefore, as shown in FIG. 9, assuming that the region equivalent to the determination region where the face of the person P1 is detected is a region E1; the area equivalent to the determination area where the face of the person P2 is detected is a region E2; the region equivalent to the determination region where the face of the person P3 is detected is a region E3; and the region equivalent to the determination region where the face of the person P4 is detected is a region E4, the designated region is the region E3 equivalent to the determination region where the face of the person P3 is detected. Then, an AE process is performed using the luminance evaluation value calculated in a manner that a degree of contribution of the luminance evaluation value obtained from the region E3 is 50%, and a whole degree of contribution of the luminance evaluation values obtained from the regions E1, E2, and E3 is 50%.

On the other hand, when NO is determined in the step S11, the AE process giving importance to the central region of the object scene image is performed in a step S23, and the AF process using the central region of the object scene image as a reference is performed in a step S25, and then, the process proceeds to the step S21.

In the step S21, similar to the step S5, the key state signal is fetched from the key input device 46.

In a step S27, it is determined whether or not the shutter button 46S is in a half-depressed state, and when YES is determined, the process returns to the step S21. Thus, when the half-depressed state of the shutter button 46S is held, the character display in the step S15 and adjusted values of a photographing condition in the steps S17 and S19, or steps S23 and S25 are fixed.

When NO is determined in the step S27, it is determined whether or not the shutter button 46S is completely depressed in a step S29, and when YES is determined, a recording process is executed in a step S31 and ended. When NO is determined in the step S29, it is determined that the half-depressed state is canceled without the shutter button 46S being completely depressed, and thus, a process in a step S33 for deleting the character indicating the designated region displayed in the step S15 is executed, and the process proceeds to the step S9.

By the process in the step S31, the JPEG data representing the object scene image at a time when the shutter button 46S is operated is recorded in the recording medium 40 in a file format. The detail is described later.

Next, the face detecting task is described. With reference to FIG. 16, in a step S41, the face information is initialized to set to a state that no face information is obtained. When the vertical synchronization signal Vsync is generated, YES is determined in a step S43, the face searching process is executed in a step S45, and it is determined whether or not the value of the face detection flag for indicating that the face is detected by the face searching process is "1" in a step S47. When YES, i.e., when the value is "1", which means that the value of the face detection flag indicates that the face is detected by the face searching process, the character C1 is displayed according to the face information, and when NO is determined, the character C2 is non-displayed, and then, the process returns to the step S43. In the case of the object scene image in which the four persons P1, P2, P3, and P4 are photographed as shown in FIG. 5, the character C1 is displayed to be overlapped with the through image in a manner shown in FIG. 6.

The face searching process shown as the step S45 is executed according to a subroutine shown in FIG. 17A and FIG. 17B. At first, in a step S61, the setting of the face determining region is initialized. Thereby, the maximum-sized face determining region is arranged at the upper left of the search region set to the display image region 28a. The face determining region is set on the display image region 28a shown in FIG. 2 so that the coordinates at the upper left of the face determining region match the coordinates at the upper left of the search region. In a step S63, in the face searching process, the value of the face detection flag for indicating that the face is detected is initialized to "0" which means that the face is not detected.

In a step S65, the feature amount of the set face determining region is detected, and in a step S67, the detected feature amount is compared with the feature amount of the dictionary. In a step S69, it is determined whether or not the partial image belonging to the face determining region is a face image based on the checking result in the step S67.

Figures 18, 19:
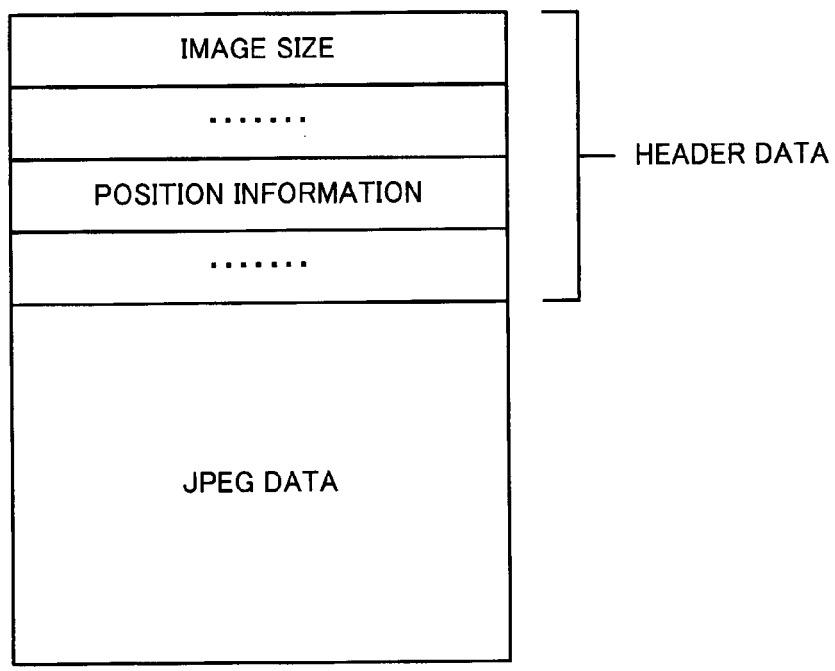
FIG. 18 is a descriptive diagram for describing the operation of the first embodiment of the present invention.
FIG. 19 is a descriptive diagram for describing the operation of the first embodiment of the present invention.

When YES is determined in the step S69, the face information is updated in a step S71. The face information includes: the central position and the size of the face determining region when it is determined to be the face image; and the degree of reliability, as shown in FIG. 18. Then, in a step S73, the value of the face detection flag is set to "1", and then, the process proceeds to a step S75. The degree of reliability indicates, in the checking process in which the feature amount of the partial image belonging to the face determining region is checked against that of the dictionary stored in the flash memory 48, a ratio of being coincident therebetween. The higher the matching ratio, the greater the degree of reliability in which the image is determined as a face.

When NO is determined in the step S69, the process proceeds to the step S75 without performing the steps S71 and S73. In the step S75, it is determined whether or not the coordinates at the lower right of the face determining region are coincident with the coordinates at the lower right of the search region. When NO is determined in this step, the face determining region is moved by a predetermined amount in a raster direction in a step S77, and the process returns to the step S65.

When YES is determined in the step S75, it is determined whether or not the size of the face determining region is "minimum" in a step S79. When the size of the face determining region is "minimum", the process is restored to a routine at a hierarchical upper level, assuming that the search of the face image from the search region is ended. When the size of the face determining region is one of "maximum" and "middle", the size of the face determining region is reduced by one step in a step S81, the face determining region is arranged at the upper left of the search region in a step S83, and then, the process returns to the step S65.

Now, returning to FIG. 14A and FIG. 14B, the process in the step S31 is described. By the process in the step S31, the JPEG data representing the object scene image at a time when the shutter button 46S is operated is recorded in the recording medium 40 in a file format shown in FIG. 19. That is, the number of pixels of the JPEG data, as header data, is recorded in the recording medium 40 as one file (however, when there is the position information indicating the position of the designated region set in the step S13, the number of pixels of the JPEG data are recorded, together with this position information).

Figure 7:
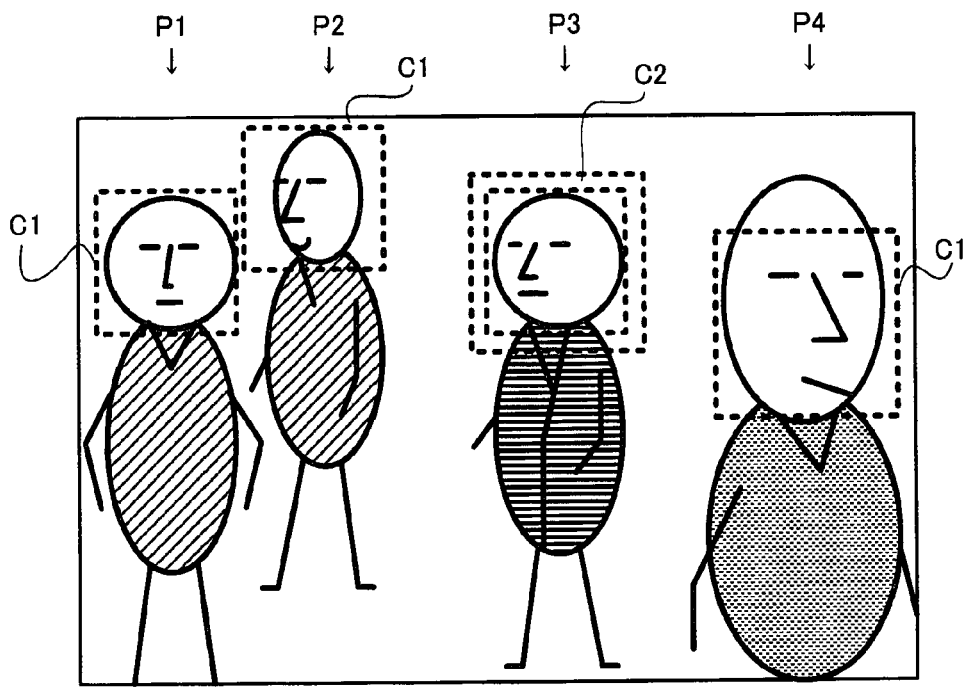
FIG. 7 is a descriptive diagram for describing the operation of the first embodiment of the present invention.

It is noted that the characters C1, C2, and C3 shown in FIG. 6 and FIG. 7 are merely one example, and the color, pattern, thickness, strict size, transmittance within the frame, etc., of each of the characters can arbitrarily be set. Furthermore, the display of the character C3 may be substituted by changing any one of the color, pattern, thickness, transmittance within the frame of the character C2.

Figure 20A:
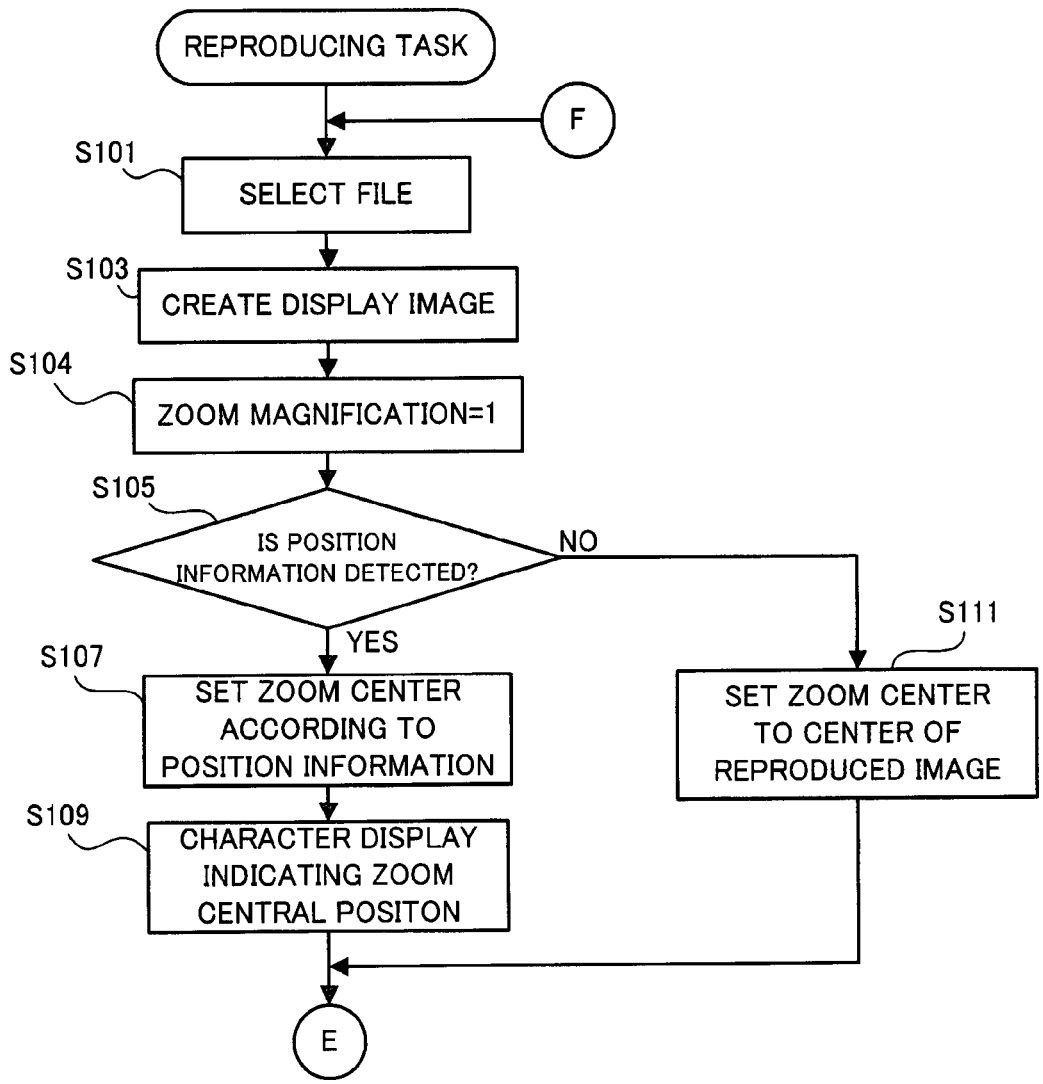
FIG. 20A is a flowchart for describing the operation of the first embodiment of the present invention.
Figure 20B:
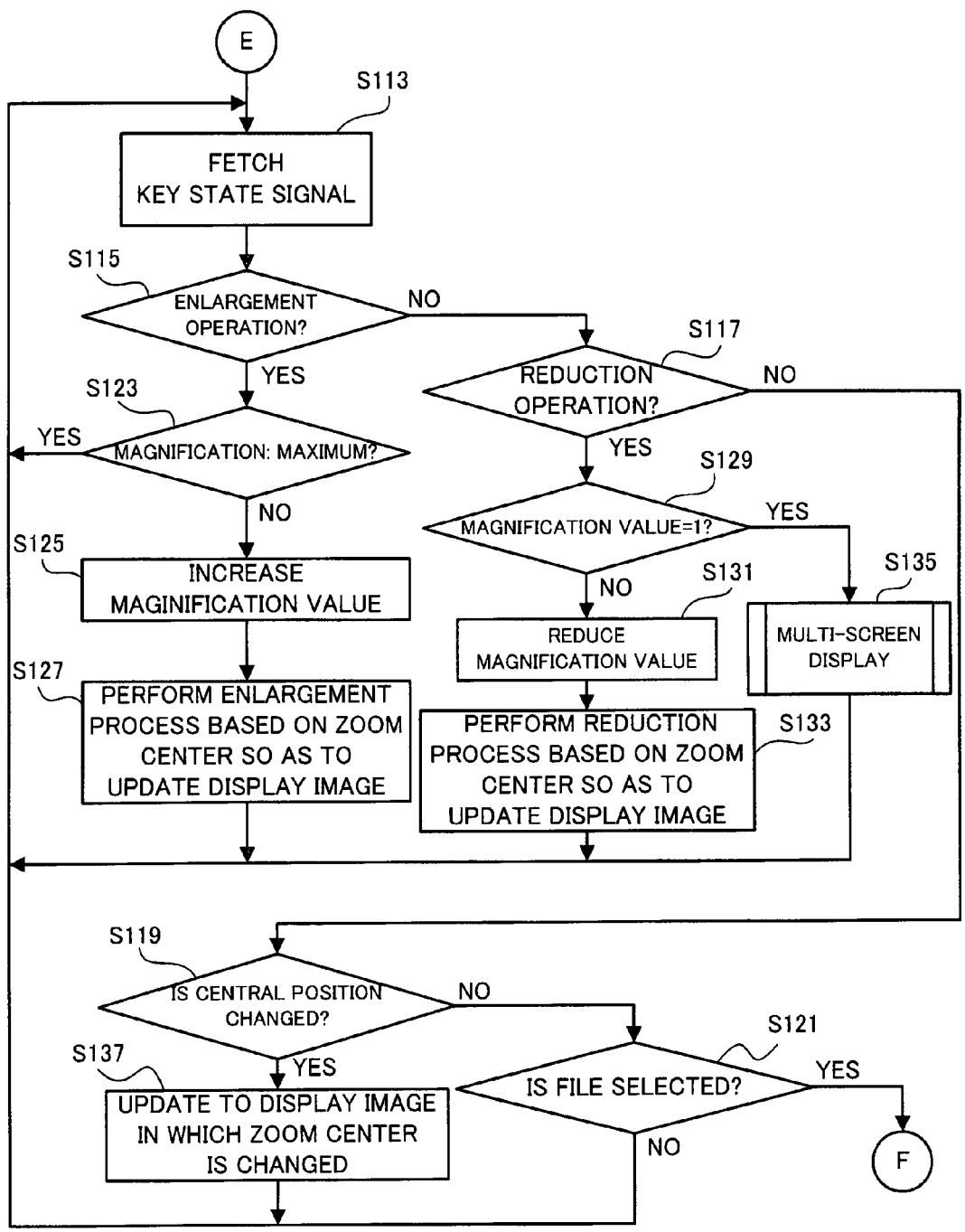
FIG. 20B is a flowchart for describing the operation of the first embodiment of the present invention.

The CPU 42 executes a reproducing task shown FIG. 20A and FIG. 20B at a reproducing operation time. It is noted that the control program corresponding to the reproducing task is stored in the flash memory 48 similar to the control program corresponding to the tasks executed in the photographing operation.

In a step S101, a file to be reproduced is selected. In a step S103, the JPEG data within the selected file is used to create a display image, and the created display image is displayed on the LCD monitor 32. More specifically, one JPEG data recorded in the recording medium 40 in a file format via the I/F 38 is selected and read out, and written to the compressed image region 28c of the SDRAM 28. The JPEG decoder 37 reads out the JPEG data accommodated in the compressed image region 28c through the memory control circuit 26, decompresses the read JPEG data, and writes the obtained image data to the uncompressed image region 28b through the memory control circuit 26. The image data written to the uncompressed image region 28b is read out through the memory control circuit 26, and from the read image data, the image data used for display, having a resolution lower than that of the image data, is created and written to the display image region 28a of the SDRAM 28. The video encoder 30 reads out the image data accommodated in the display image region 28a through the memory control circuit 26 at every 1/30 seconds, and converts the read image data into a composite video signal. As a result, a reproduced image is displayed on the LCD monitor 32.

In a step S104, the CPU 42 sets the value of the zoom magnification, held by the CPU 42, to "1" as an initial value.

Upon detection that the position information, together with the JPEG data, are recorded in the recording medium 40 by a step S105, a zoom center of the zoom process to be performed later in a step S107 is set by utilizing the position information, a character indicating the position set as the zoom center is displayed in a step S109, and the process proceeds to a step S113.

It is noted that the position information recorded in the recording medium 40 is position information represented by the number of pixels on the image data accommodated in the display image region 28a, and therefore, in reproducing, it is thus converted into the position information represented by the number of pixels on the image data written to the uncompressed image region 28b of the SDRAM 28, and the converted position information is used for the reproduction zoom process. The display image region 28a is made up of the image data having 240 pixels vertically and 320 pixels horizontally. When the image data written to the uncompressed image region 28b of the SDRAM 28 by reproducing the JPEG data is made up of image data having 1944 pixels vertically and 2592 pixels horizontally, a value of 8.1, obtained by dividing 1944 by 240 is multiplied by a value representing a vertical position of the image data written to the display image region 28a, and a value of 8.1, obtained by dividing 2592 by 320 is multiplied by the value representing the horizontal position of the image data written to the display image region 28a. In this manner, the position information recorded in the recording medium 40 is converted into the position information representing the position on the image data written to the uncompressed image region 28b of the SDRAM 28 by reproducing the JPEG data, and the converted position information is used for the reproduction zoom process.

Furthermore, the character display by the step S109 may be omitted, or the displayed character may be non-displayed after the display is continued for a predetermined time or at a time when any operation is thereafter performed.

On the other hand, when NO is determined in the step S105, the zoom center in the zoom process to be performed later in a step S111 is set to the center of the image data written to the uncompressed image region 28b, and then, the process proceeds to the step S113.

In the step S113, the key state signal is fetched from the key input device 46, and it is determined whether or not a tele-button 46T is depressed to perform an enlargement operation in a step S115, it is determined whether or not a wide button 46W is depressed to perform a reduction operation in a step S117, it is determined whether or not a position change button 46S is depressed to perform a change operation of the zoom center position in a step S119, and it is determined whether or not a forward button 46F or a back button 46B is depressed to perform a selection operation of a file in a step S121.

When YES is determined in the step S115, it is detected whether or not the value of the zoom magnification is a maximum value in a step S123. When YES is determined in this step, the process returns to the S113 as it is. However, when NO is determined, the value of the zoom magnification is increased by a predetermined amount in a step S125. In a step S127, an enlargement process is performed on the image data written to the uncompressed image region 28b based on the updated zoom magnification and the zoom center position, and by updating the image data accommodated in the display image region 28a, an image to be displayed on the LCD monitor 32 is enlarged, and then, the process returns to the step S113.

When YES is determined in the step S117, it is detected whether or not the value of the zoom magnification is "1" as an initial value in a step S129. When YES is determined, a multi-screen display is performed in a step S135, and the process returns to the step S113. When NO is determined in the step S129, the value of the zoom magnification is reduced by a predetermined amount in a step S131. In a step S133, a reduction process is performed on the image data written to the uncompressed image region 28b based on the zoom magnification updated and the zoom center position, and by updating the image data accommodated in the display image region 28a, an image to be displayed on the LCD monitor 32 is reduced, and then, the process returns to the step S113.

Figure 21:
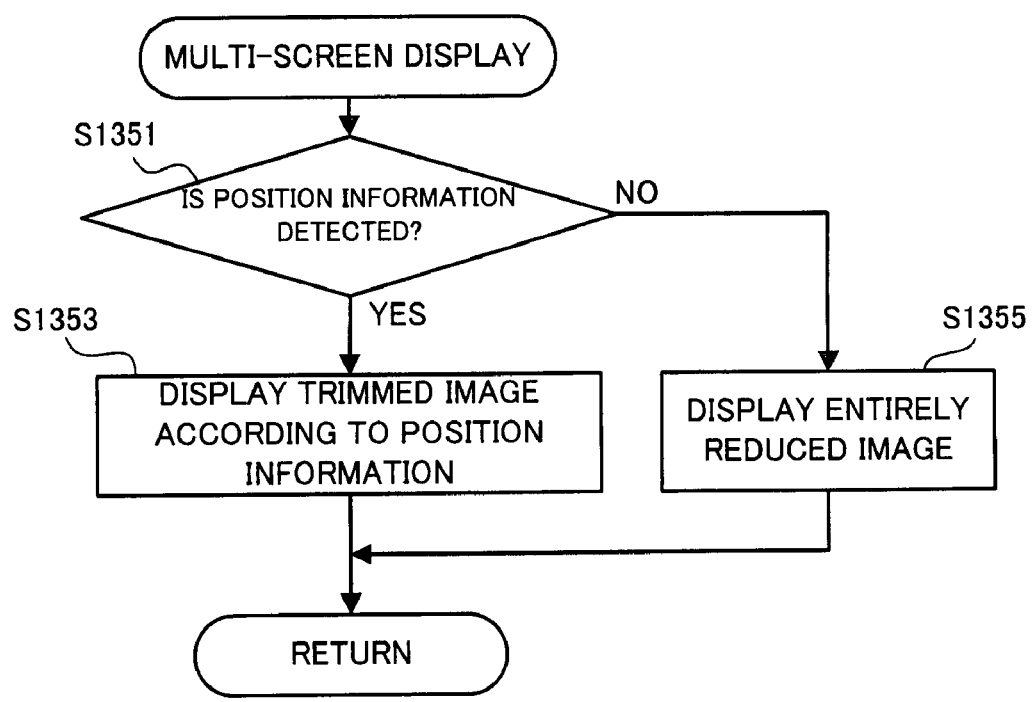
FIG. 21 is a flowchart for describing the operation of the first embodiment of the present invention.

The multi-screen display shown in the step S135 is performed according to a flowchart shown in FIG. 21. Upon detection that the position information, together with the JPEG data, are recorded in the recording medium 40 in a step S1351, image data obtained by performing a trimming process and the reduction process on the image data written to the uncompressed image region 28b according to the position information are displayed as one of the multi screen in a step S1353 while when NO is determined in the step S1351, image data obtained by performing the reduction process on the entire image data written to the uncompressed image region 28b is displayed as one of the multi screen, and the process is restored to a routine at a hierarchical upper level.

Figure 22:
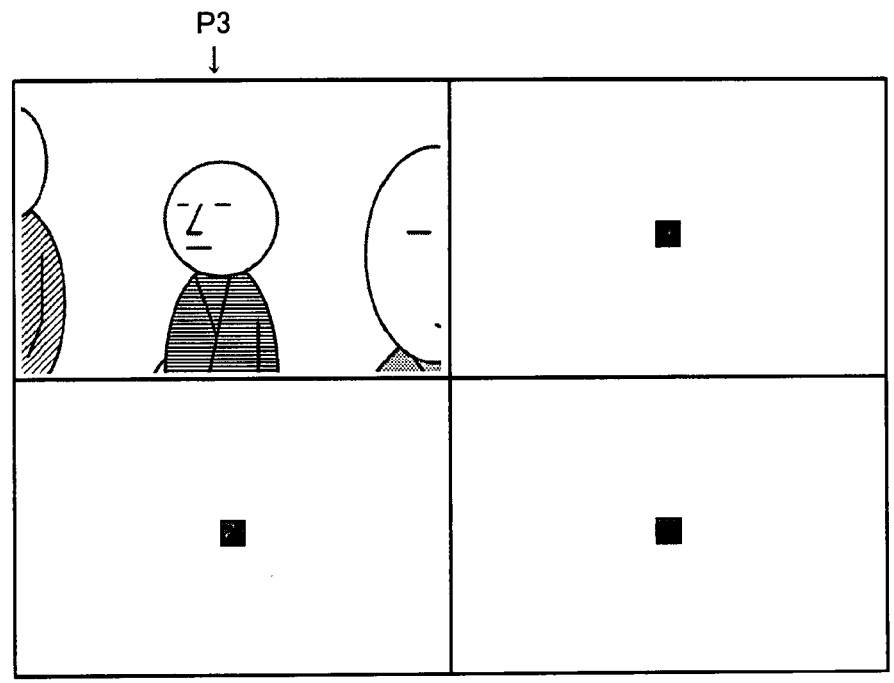
FIG. 22 is a descriptive diagram for describing the operation of the first embodiment of the present invention.
Figure 23:
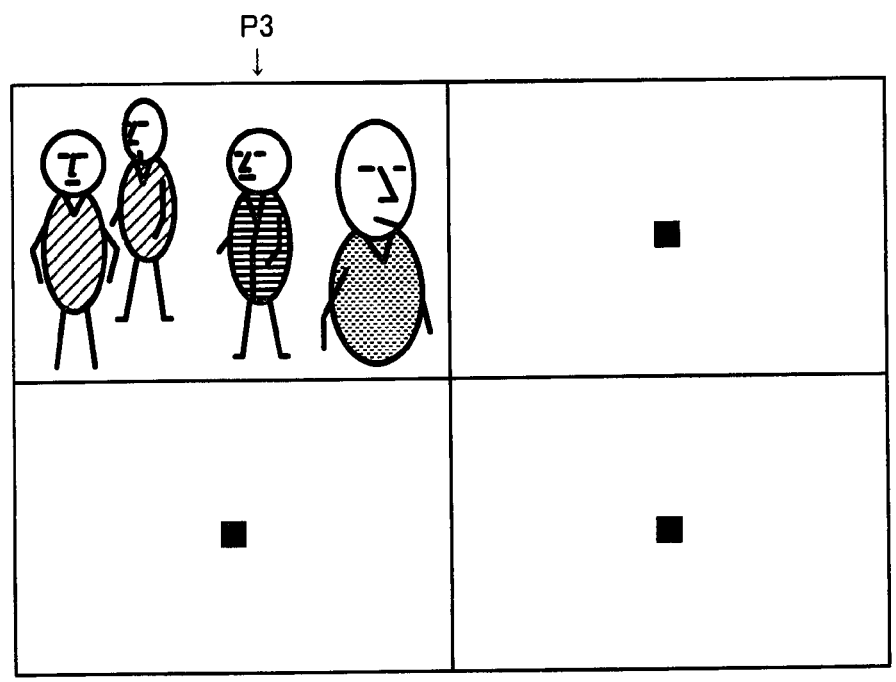
FIG. 23 is a descriptive diagram used for a comparison with the operation of the first embodiment of the present invention.

For example, in the case of the image in which the four persons P1, P2, P3, and P4 are photographed as shown in FIG. 5, the multi-display obtained as a result of the execution of the step S1353 is as shown in FIG. 22, and the multi-screen display obtained as a result of the execution of the step S1355 is as shown in FIG. 23. In the multi-display obtained as a result of the execution of the step S1353, only a portion of the image including an important portion is multi-screen displayed. Thus, it becomes easy to select the image.

It is noted that the number of divisions of the multi-screen display is not restricted to 4. A relative position, between the images displayed before being changed to the multi-screen display in the step S135 and the images to be displayed in other regions, is arbitrarily set for a digital camera. The images to be displayed in the other regions are obtained from another file recorded in the recording medium 40. It is noted that although the description is omitted, the file includes, in addition to the JPEG data as a main image, thumbnail image data smaller in resolution (the number of pixels) than the JPEG data. Thus, the thumbnail image data may be regarded as image data to be used for the multi-screen display. At this time, the position information used in the step S1353 is converted as needed and used depending on the number of pixels of the thumbnail image data.

Returning to FIG. 20A and FIG. 20B, the description continues. When YES is determined in the step S119, in a step S137, the image data written to the uncompressed image region 28b is processed, and the image data accommodated in the display image region 28a is updated to the image data in which the zoom center position is changed, whereby the central position of the enlarged image to be displayed on the LCD monitor 32 is updated, and then, the process returns to the step S113.

When YES is determined in the step S121, the process returns to the step S101 to change a file which is a target to be reproduced. When NO is determined, the process returns to the step S113.

According to a first embodiment, on the assumption that the center of the reproduction zoom process is not set by the position information accompanying the JPEG data read out from the recording medium 40, the center of the image is the central position of the zoom process and is displayed in an enlarged manner, as shown in FIG. 12(A) to FIG. 12(C). Thus, after an enlarge display operation, the central position needs to be changed. However, even with respect to the same reproduced image, when the center of the reproduction zoom process is set by the position information, a position corresponding to the position information is the central position and is displayed in an enlarged manner, as shown in FIG. 13(A) to FIG. 13(C). Thus, it is possible to reproduce the image more easily in an enlarged manner corresponding to a position noticed by the digital camera 10 when photographing.

Furthermore, when the detected face information is one, the designated region in the first embodiment is set to a central position of the face determining region when the face is detected in the face determining process, and when a plurality of faces are detected, the designated region is set to a central position of the face determining region when the face nearest the central position of the angle of view is detected in the face determining process. However, the designation of the designated region, i.e., a designating method of a specified position within the object scene image generated by the imager is not restricted thereto. When a plurality of faces are detected, the designated region may be set to a central position of the face determining region when a largest face is detected, or be set to a central position of the face determining region when a face is detected with a highest degree of reliability, for example. In the case of the object scene image including the four persons P1, P2, P3, and P4 as shown in FIG. 5, and as a result of the face detection, the face detection as shown in FIG. 6 is obtained, when the designated region is set to the central position of the face determining region when the largest face is detected, the position of the face of the person P4 is set, and when the designated region is set to the central position of the face determining region when the face is detected with the highest degree of reliability, the position of the face of the person P1 who faces a front is set.

Additionally, the face detection according to the first embodiment enables a plurality of faces to be detected. It may be so configured that when even one face image is discovered in the course of the detection process, the face detection process is ended to determine the designated region based on the detection result. In this case, the checking process between the feature amounts and the moving process of the face determining region are executed by using three face determining regions in descending order of size: the maximum size; the middle size; and the minimum size, and therefore, a larger face is preferentially detected in the object scene.

Figure 24:
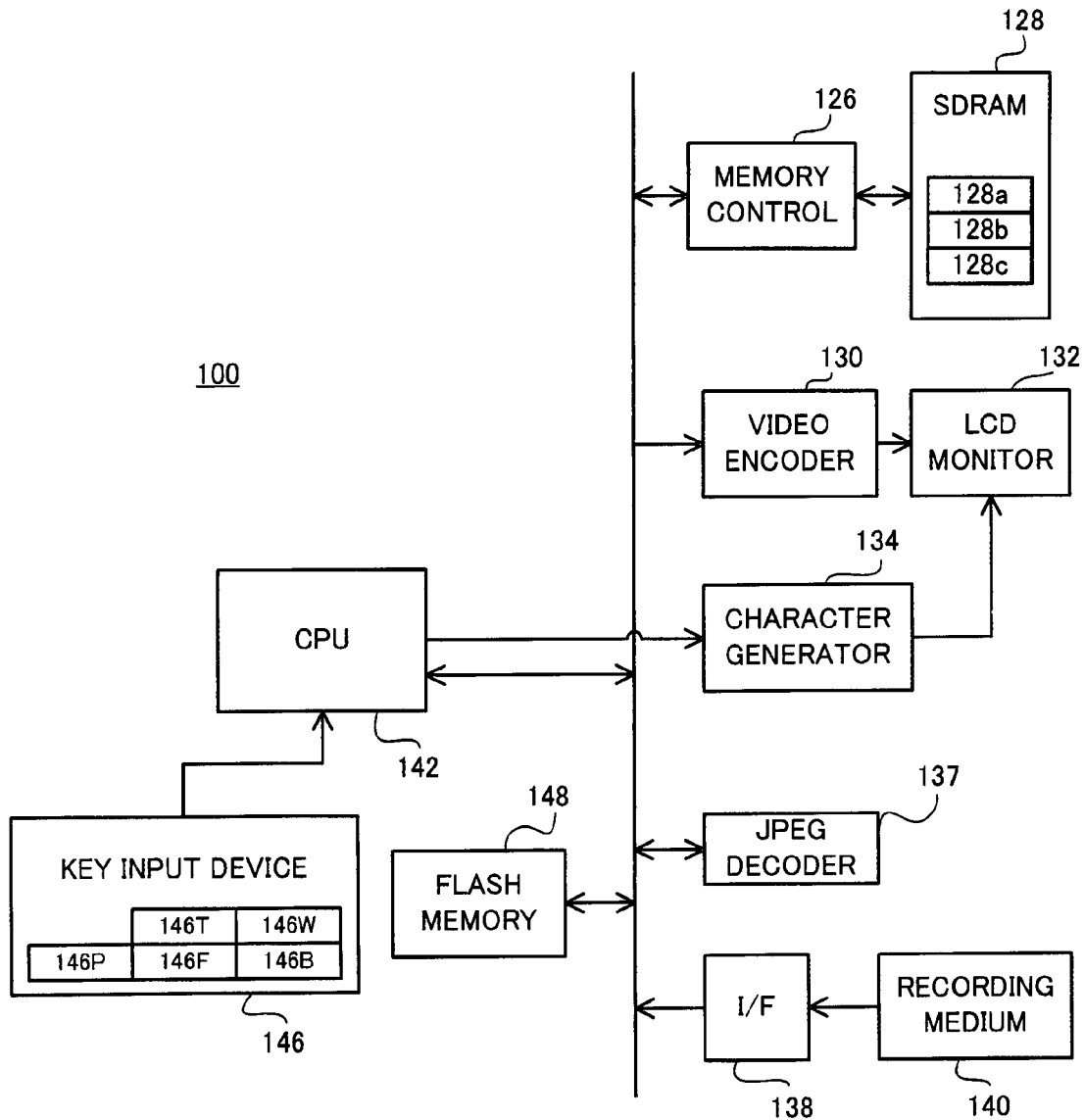
FIG. 24 is a block diagram showing an image reproducing apparatus which is a second embodiment of the present invention.

With reference to FIG. 24, a second embodiment of the present invention is described. An image reproducing apparatus 100 according to the second embodiment of the present invention is a reproducing apparatus for reproducing an object scene image from a recording medium recorded thereon with position information indicating a specific position within the object scene image as that which is obtained in the digital camera 10 according to the first embodiment of the present invention, together with the object scene image.

Any one of JPEG data recorded in a recording medium 140 in a file format via an I/F 138 is selected and read out, and the resultant data is written to a compressed image region 128c of an SDRAM 128. A JPEG decoder 137 reads out the JPEG data accommodated in the compressed image region 128c through the memory control circuit 126, decompresses the read JPEG data, and writes the obtained image data to the uncompressed image region 128b through the memory control circuit 126. The image data written to the uncompressed image region 128b is read out through the memory control circuit 126, and from the read image data, image data for display having a resolution lower than that of the image data is created and written to a display image region 128a of the SDRAM 128.

A video encoder 130 reads out the image data accommodated in the display image region 128a through the memory control circuit 126 at every 1/30 seconds, and converts the read image data into a composite video signal. As a result, a reproduced image is displayed on an LCD monitor 132.

In the recording medium 140, position information indicating a position designated at the time of photographing is recorded in the JPEG data, and when the position information may be read out, the central position of the reproduction zoom process is set based on the position information, and in this state, a zoom display is performed. When the JPEG data in which no position information is obtained is read out, the center of the image is set to the central position of the reproduction zoom process, and in this state, the zoom display is performed.

It is noted that unlike in the first embodiment, the position information is position information having a value corresponding to the number of pixels of the JPEG data, and thus, there is no need of converting the value as in the first embodiment.

The zoom display is performed by accommodating in the display image region 28a image data obtained by applying a zoom process to the image data written in the uncompressed image region 128b based on the zoom magnification and the zoom center position.

It is noted that when the position information is set to the central position of the reproduction zoom process, a character generator 134 applies character data to the LCD monitor 32 in order to display the designated region. Such a character display may be omitted.

Figure 25A:
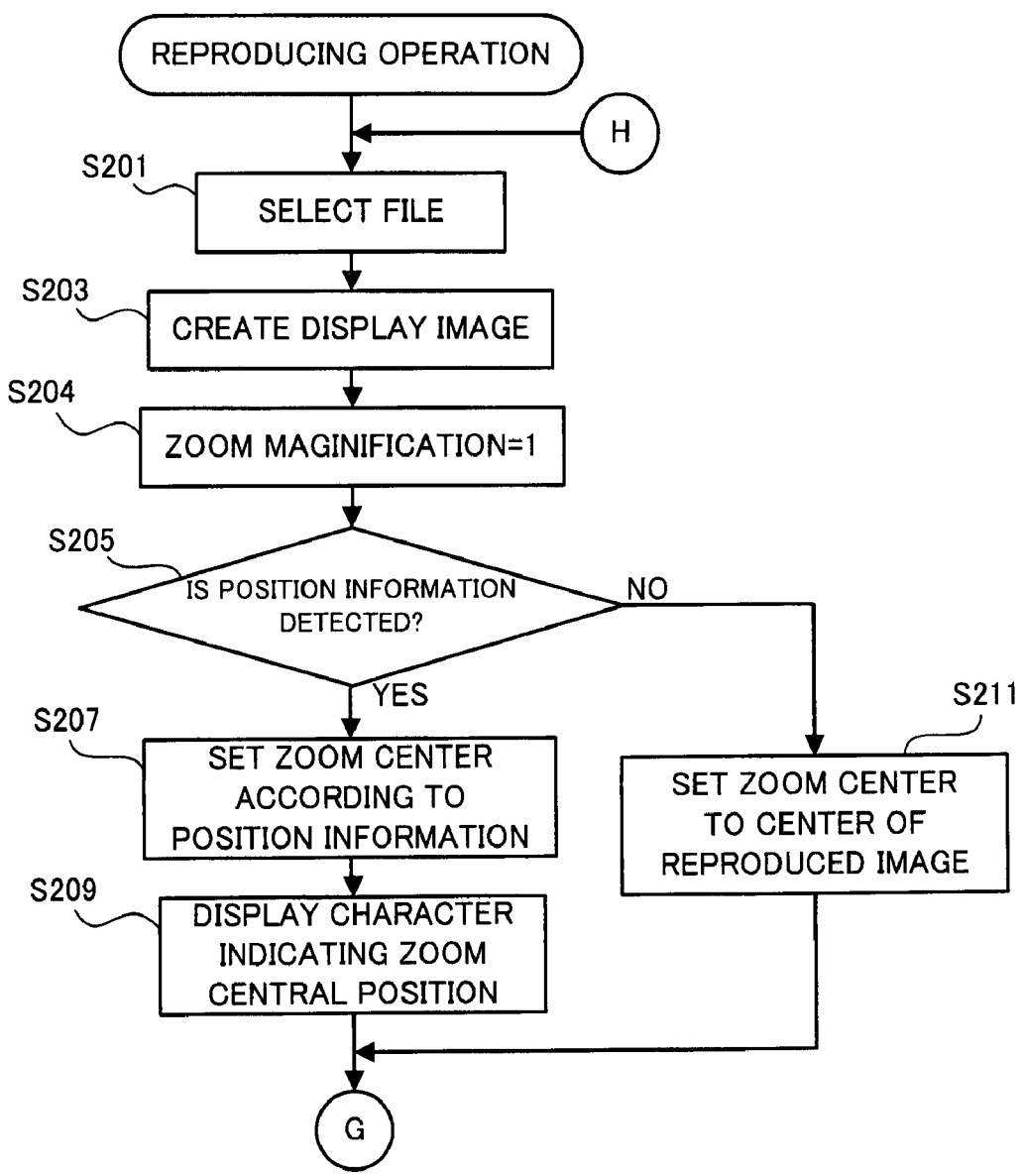
FIG. 25A is a flowchart for describing an operation of the second embodiment of the present invention.
Figure 25B:
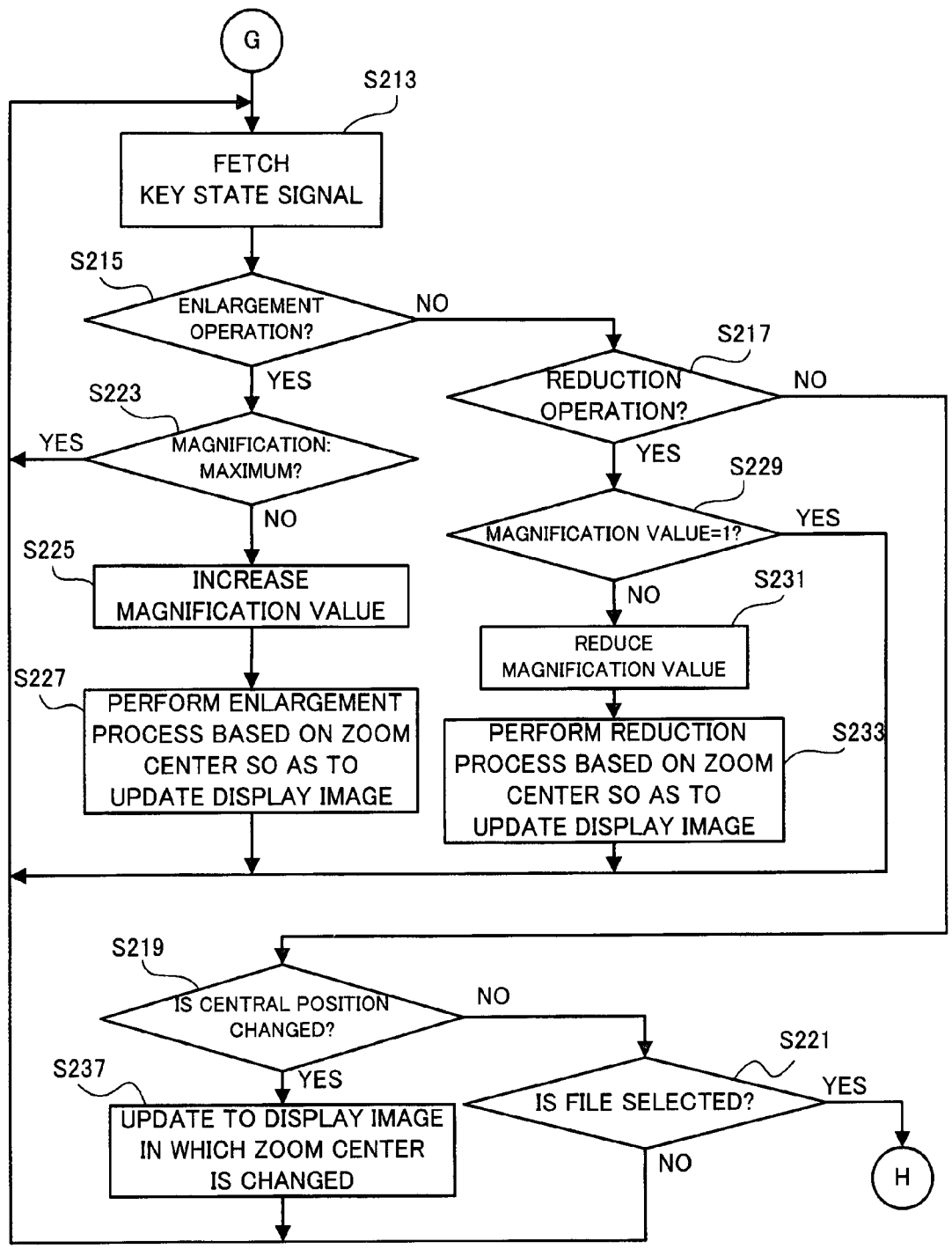
FIG. 25B is a flowchart for describing the operation of the second embodiment of the present invention.

A CPU 142 executes a reproducing operation shown in FIG. 25A and FIG. 25B at a reproducing operation time. It is noted that a control program for executing the reproducing operation is stored in a flash memory 148.

In a step S201, a file to be reproduced is selected. In a step S203, the JPEG data within the selected file is used to create a display image, and the created image is displayed on the LCD monitor 132. More specifically, any one JPEG data recorded in the recording medium 140 in a file format via the I/F 138 is selected and read out, and written to the compressed image region 128c of the SDRAM 128. A JPEG decoder 37 reads out the JPEG data accommodated in the compressed image region 128c through the memory control circuit 126, decompresses the read JPEG data, and writes the obtained image data to the uncompressed image region 128b through the memory control circuit 126. The image data written to the uncompressed image region 128b is read out through the memory control circuit 26, and from the read image data, image data used for display having a resolution lower than that of the image data is created and written to the display image region 28a of the SDRAM 128. A video encoder 130 reads out the image data accommodated in the display image region 128a through the memory control circuit 126 at every 1/30 seconds, and converts the read image data into a composite video signal. As a result, a reproduced image is displayed on an LCD monitor 132.

In a step S204, the CPU 142 sets a held value of the zoom magnification to "1" as an initial value.

Upon detection that the position information, together with the JPEG data, are recorded in the recording medium 140 by a step S205, the zoom center in the zoom process to be performed later is set by using the position information in a step S207, a character indicating the position set as the center of the zoom is displayed in a step S209, and the process proceeds to a step S213.

It is noted that the character display in the step S209 may be omitted, or the displayed character may be non-displayed after the display is continued for a predetermined time or at a time when any operation is thereafter performed.

On the other hand, when NO is determined in the step S205, the zoom center in the zoom process to be performed later in a step S211 is set to the center of the image data written to the uncompressed image region 128b, and the process proceeds to the step S213.

In the step S213, a key state signal is fetched from the key input device 146, and it is determined whether or not a tele-button 146T is depressed to perform an enlargement operation in a step S215, it is determined whether or not a wide button 146W is depressed to perform a reduction operation in a step S217, it is determined whether or not a position change button 146S is depressed to perform a change operation of the zoom center position in a step S219, and it is determined whether or not a forward button 146F or a back button 146B is depressed to perform a selection operation of a file in a step S221.

When YES is determined in the step S215, it is detected whether or not the value of the zoom magnification is a maximum value in a step S223. When YES is determined, the process returns to the S213 as it is. However, when NO is determined, the value of the zoom magnification is increased by a predetermined amount in a step S225. In a step S227, an enlargement process is performed on the image data written to the uncompressed image region 128b based on the updated zoom magnification and the zoom center position, and by updating the image data accommodated in the display image region 128a, an image to be displayed on the LCD monitor 132 is enlarged, and then, the process returns to the step S213.

When YES is determined in the step S217, it is detected whether or not the value of the zoom magnification is "1" as an initial value in a step S229. When YES is determined, the process returns to the S213 as it is. However, when NO is determined in the step S229, the value of the zoom magnification is reduced by a predetermined amount in a step S231, a reduction process is performed on the image data written to the uncompressed image region 128b based on the updated zoom magnification and zoom center position in the step S231, and by updating the image data accommodated in the display image region 128a, an image to be displayed on the LCD monitor 132 is reduced, and then, the process returns to the step S213.

When YES is determined in the step S219, in a step S237, the image data written to the uncompressed image region 128b is processed, and the image data accommodated in the display image region 128a is updated to the image data in which the zoom center position is changed, whereby the central position of the enlarged image to be displayed on the LCD monitor 132 is updated, and then, the process returns to the step S113.

When YES is determined in the step S221, the process returns to the step S201 to change the file which is a target to be reproduced. When NO is determined, the process returns to the step S213.

According to this embodiment, on the assumption that when the center of the reproduction zoom process is not set by the position information accompanying the JPEG data read out from the recording medium 140, the center of the image is the central position of the zoom process and is displayed in an enlarged manner, as shown in FIG. 12(A) to FIG. 12(C). Thus, after an enlargement display operation, the central position needs to be changed. However, even with respect to the same reproduced image, when the center of the reproduction zoom process is set by the position information, a position corresponding to the position information is the central position and is displayed in an enlarged manner, as shown in FIG. 13(A) to FIG. 13(C). Thus, it is possible to reproduce the image more easily in an enlarged manner corresponding to a position noticed when photographing.

Although the embodiments of the present invention are described in the foregoing, the present invention is not restricted to the above-described embodiments.

Figure 26:
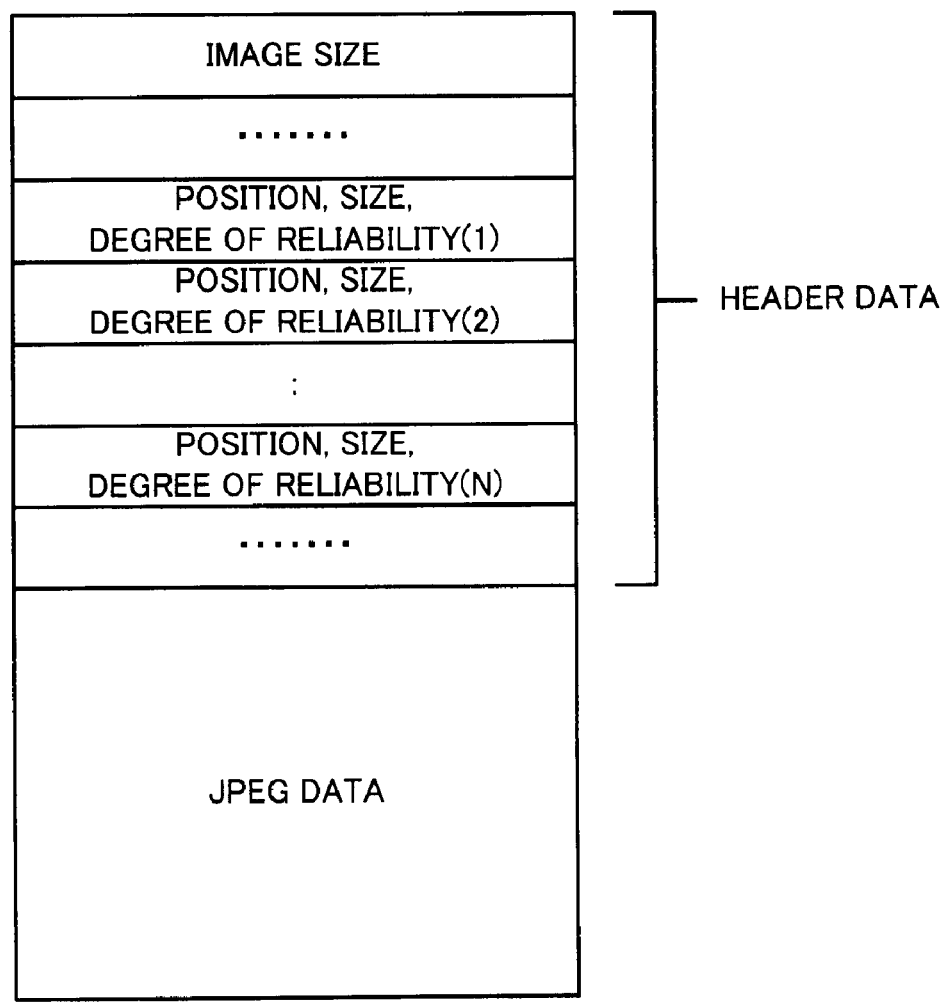
FIG. 26 is a descriptive diagram for describing the embodiment of the present invention.

An electronic camera may be so configured that for one object scene image, positions, sizes and degrees of reliabilities of a plurality of face information may be recorded in the recording medium to use these items, as shown in FIG. 26. Then, in reproducing, selection may be made as to which position information is to be used. In selecting, depending on the value of the size and the magnitude of the degree of reliability, an order and a priority for selection may be determined. Furthermore, by using the value of the size, an initial value of a zoom magnification for the enlarged display may be determined.

As a feature image, not face image but images of a soccer ball and small animals may be searched to thereby designate a specific position within the object scene image. The specified position may not be a position designated by utilizing the image recognition process like a face detection, etc., but may be a position of the nearest subject, a position of the farthest subject, and a position of the subject nearest the center of the angle of view which are detected by an AF function, and a position directly pointed by the user with a pointing device like a touch panel, etc., when photographing.

In the electronic camera or the object-scene-image reproducing apparatus, the reproduction using position information is not restricted to the enlarged reproduction and the trimming reproduction, and an object scene image may be reproduced from the position indicated by the position information as if a hole is expanded, and an object scene image may be reproduced while being rotated about the position indicated by the position information.

The object scene image needs not to be recorded by compression, and may be recorded in a non-compression state. As the position information, not the number of pixels but a ratio on the monitor (a position of X % in a longitudinal direction and Y % in a horizontal direction) may be used to specify.

The object scene image may not only be a still image but also be a moving image or a part of the moving image, such as an I picture (Intra-Coded Picture) within MPEG image data. As shown in FIG. 26, a plurality of position information for one object scene image may be recorded in the recording medium to use these items. Then, in reproducing, selection may be made as to which position information is to be used for reproduction. The position information used in reproducing is not restricted to one, and reproduction by using a plurality of position information, such as, enlarged reproduction and trimming reproduction of the region enclosed by a plurality of position information may be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
an imager, having an imaging surface for capturing a scene, which generates a scene image;
a designator which designates a single partial region on the scene image generated by said imager, in a manner which is different depending on a distribution state of one or at least two feature images detected from the scene image generated by said imager;
an adjustor which executes a process of adjusting an imaging condition of said imager, based on the scene image generated by said imager, in a manner of putting emphasis more on the partial region designated by said designator than another region on the scene image generated by said imager;
a recorder which records, together with position information indicative of a position of the partial region designated by said designator, the scene image generated by said imager under the imaging condition adjusted by said adjuster; and
a reproducer which reproduces the scene image recorded by said recorder, in a manner being different depending on a position which is indicated by the position information recorded by said recorder.

2. An electronic camera according to claim 1, wherein said designator includes a searcher which searches the feature image from the scene image, and a region designator which designates the partial region based on a search result of said searcher.

3. An electronic camera according to claim 1, wherein said imaging condition includes a focal distance of said imager.

4. An electronic camera according to claim 1, wherein said reproducer includes an enlarger which enlarges the scene image in reference to a position specified by the position information as a center.

5. An electronic camera according to claim 1, wherein said imaging condition includes an exposure amount of said imaging surface.

6. An electronic camera according to claim 1, wherein said designator designates the single partial region irrespective of the number of the feature images.

* * * * *